United States Patent
Kindl

(10) Patent No.: US 11,313,463 B2
(45) Date of Patent: Apr. 26, 2022

(54) TRANSMISSION AND VEHICLE WITH A TRANSMISSION

(71) Applicant: BRP-ROTAX GMBH & CO. KG, Gunskirchen (AT)

(72) Inventor: Robert Kindl, Gunskirchen (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 269 days.

(21) Appl. No.: 16/777,105

(22) Filed: Jan. 30, 2020

(65) Prior Publication Data

US 2020/0248804 A1 Aug. 6, 2020

Related U.S. Application Data

(60) Provisional application No. 62/799,445, filed on Jan. 31, 2019.

(51) Int. Cl.
*F16H 63/18* (2006.01)
*F16H 63/30* (2006.01)
*F16H 61/28* (2006.01)

(52) U.S. Cl.
CPC ............ *F16H 63/18* (2013.01); *F16H 63/30* (2013.01); *F16H 61/28* (2013.01); *F16H 2061/2869* (2013.01)

(58) Field of Classification Search
CPC .......... F16H 63/18; F16H 63/30; F16H 61/28; F16H 2061/2869
USPC ...................................................... 74/337.5
See application file for complete search history.

(56) References Cited

U.S. PATENT DOCUMENTS

| 6,076,624 A * | 6/2000 | Izumi ................... F16D 41/06 180/291 |
| 6,250,415 B1 * | 6/2001 | Seto ..................... B60K 17/22 180/337 |
| 6,725,962 B1 | 4/2004 | Fukuda |
| 7,441,477 B2 | 10/2008 | Ho |

(Continued)

FOREIGN PATENT DOCUMENTS

| JP | 201891375 A | 6/2018 |
| WO | 2013175082 A1 | 11/2013 |

OTHER PUBLICATIONS

English abstract of JP201891375 retrieved from https://worldwide.espacenet.com/ on Jan. 30, 2020.

(Continued)

*Primary Examiner* — Ha Dinh Ho
(74) *Attorney, Agent, or Firm* — BCF LLP

(57) ABSTRACT

A transmission includes a first shaft with two gears adapted for connecting to a motor and a second shaft with two corresponding gears adapted for connecting to a driveshaft; a shift drum selectively controlling torque transfer between the shafts and defining therein two grooves; a shift rod translatable along a rod axis with a driving member fixedly connected thereto and engaging one groove, at least a portion of the groove causing the driving member and the shift rod to translate along the rod axis upon rotation of the shift drum; an engagement dog disposed on the second shaft for selectively engaging the gears of the second shaft; two biasing members disposed around the shift rod; a fork rod supporting a shift fork slidably connected to the fork rod and the shift rod, the shift fork being engaged in another groove of the shift drum.

38 Claims, 14 Drawing Sheets

(56) References Cited

U.S. PATENT DOCUMENTS

| | | | |
|---|---|---|---|
| 9,027,430 B2 | 5/2015 | Mitsubori et al. | |
| 9,556,958 B2 | 1/2017 | Tsukamoto et al. | |
| 10,041,590 B2 | 8/2018 | Maki | |
| 2010/0275713 A1* | 11/2010 | Penttila | F16H 63/18 74/473.3 |
| 2014/0090499 A1* | 4/2014 | Fernandez | F16H 59/0208 74/335 |
| 2014/0338484 A1* | 11/2014 | Maki | F16H 63/3441 74/337.5 |
| 2015/0134212 A1* | 5/2015 | Iizuka | F16H 61/0437 701/53 |
| 2017/0108119 A1 | 4/2017 | Maki | |
| 2018/0135751 A1 | 5/2018 | Maki | |
| 2018/0328487 A1 | 11/2018 | Nishimoto et al. | |

OTHER PUBLICATIONS

English abstract of WO2013175082 retrieved from https://worldwide.espacenet.com/ on Jan. 30, 2020.

Extended European Search Report dated Apr. 29, 2020 by the EPO in connection with the corresponding application No. 20154785.8.

\* cited by examiner

TRANSMISSION AND VEHICLE WITH A TRANSMISSION

CROSS-REFERENCE

The present application claims priority to U.S. Provisional Application No. 62/799,445, filed Jan. 31, 2019, the entirety of which is incorporated herein by reference.

TECHNICAL FIELD

The present technology relates to vehicle transmissions.

BACKGROUND

In vehicles with continuously variable transmissions, a sub-transmission (also referred to as simply a transmission) is generally provided which allows an operator to switch between different gear settings, for example drive gear (only one, or low and high gear), reverse, park, and/or neutral.

These transmissions often operate using one or more shift forks which selectively cause engagement between a shift or engagement dog and its corresponding gear in order to bring the transmission into a selected shift position. Shift fork position is generally controlled by a shift drum, where the shift fork is engaged in a groove defined in a surface of the shift drum. At different positions of the shift drum, the groove includes bends to cause the one or more shift forks to translate along a rod.

When the shift dog and its corresponding gear are misaligned and the shift dog and gear cannot fully engage, however, some undesirable twisting or forces may act on the shift fork and/or the shift drum due to the shift fork following the groove while encountering resistance from the shift dog that cannot fully engage.

In some cases, part of the translational movement can be transferred to the rod supporting the shift forks. For instance, the rod could include springs to aid in biasing the shift forks toward different shift positions. In such a case, the rod can become quite lengthy, as both the shift forks and biasing elements are disposed on the rod. Depending on the particular arrangement, this could results in an increase in the overall size of the transmission, taking up valuable space in its vehicle.

Therefore, there is a desire for a transmission without at least some of the inconveniences described above.

SUMMARY

It is an object of the present technology to ameliorate at least some of the inconveniences present in the prior art.

According to one aspect of the present technology, there is provided a transmission including a first shaft; a second shaft, one of the first shaft and the second shaft being adapted for operatively connecting to a motor, an other one of the first shaft and the second shaft being adapted for operatively connecting to at least one driveshaft; a shift drum for selectively controlling torque transfer between the first shaft and the second shaft, the shift drum being rotatable about a drum axis, the shift drum defining therein a first groove, a second groove, and a third groove; a shift rod extending parallel to the drum axis, the shift rod being translatable along a rod axis parallel to the drum axis; a driving member fixedly connected to the shift rod, the driving member engaging the first groove of the shift drum, at least a portion of the first groove causing the driving member and the shift rod to translate along the rod axis upon rotation of the shift drum; a first gear and a second gear disposed on the first shaft; a third gear disposed on the second shaft, the third gear operatively engaging the first gear; a first engagement dog disposed on the second shaft, the first engagement dog being rotationally fixed and axially translatable with respect to the second shaft, the first engagement dog selectively engaging the third gear to cause rotation of the second shaft by the third gear; a fourth gear disposed on the second shaft, the fourth gear operatively engaging the second gear; a second engagement dog disposed on the second shaft, the second engagement dog being rotationally fixed and axially translatable with respect to the second shaft, the second engagement dog selectively engaging the fourth gear to cause rotation of the second shaft by the fourth gear; a first biasing member disposed around the shift rod, the first biasing member having a first end and a second end, the first end of the first biasing member being axially fixed with respect to the shift rod; a second biasing member disposed around the shift rod, the second biasing member having a first end and a second end; a fork rod disposed parallel to the shift rod; a first shift fork slidably connected to the fork rod and slidably connected to the shift rod, the first shift fork engaging the second groove of the shift drum, at least a portion of the second groove and the first biasing member causing the first shift fork to selectively translate along the fork rod to control engagement of the first engagement dog with the third gear at a first rotational position of the shift drum; and a second shift fork slidably connected to the fork rod and slidably connected to the shift rod, the second shift fork engaging the third groove of the shift drum, at least a portion of the third groove and the second biasing member causing the second shift fork to selectively translate along the fork rod to control engagement of the second engagement dog with the fourth gear at a second rotational position of the shift drum. The transmission has a first shift position where: the shift drum is rotated to the first rotational position, the shift rod is translated to a first shift rod position along the rod axis by the driving member, the first engagement dog is engaged with the third gear, the second engagement dog is disengaged from the fourth gear, the transmission is transferring torque between the first shaft and the second shaft via the first gear and the third gear, and the first shift position being arranged and structured to produce a first ratio of a speed of rotation of the second shaft to a speed of rotation of the first shaft, and a second shift position where: the shift drum is rotated to the second rotational position, the shift rod is translated to a second shift rod position along the rod axis by the driving member, the second engagement dog is engaged with the fourth gear, the first engagement dog is disengaged from the third gear, the transmission is transferring torque between the first shaft and the second shaft via the second gear and the fourth gear, and the second shift position being arranged and structured to produce a second ratio of the speed of rotation of the second shaft to the speed of rotation of the first shaft.

In some embodiments, the first shaft is an input shaft adapted for operatively connecting to the motor; the second shaft is an output shaft adapted for operatively connecting to the at least one driveshaft; the first gear is a first input gear; the second gear is a second input gear; the third gear is a first output gear; and the fourth gear is a second output gear.

In some embodiments, the transmission further includes a support rod disposed parallel to the shift rod and the fork rod, the driving member slidably engaging the support rod.

In some embodiments, the transmission further includes a parking lever rotatably connected to the support rod; a parking cam connected to the shift drum; and a parking cog operatively connected to the output shaft, the parking cam selectively rotating to push the parking lever into engagement with the parking cog to prevent rotation of the output shaft.

In some embodiments, the transmission further includes a first parking spring disposed around the support rod and connected to the parking lever, the first parking spring biasing the parking lever away from the parking cog; and a second parking spring connected to the parking cam.

In some embodiments, the transmission further includes a parking lock sensor, the parking lock sensor being selectively contacted by one end of the parking lever when an other end of the parking lever is engaged with the parking cog.

In some embodiments, the transmission further includes a third biasing member disposed around the shift rod and biasing the first shift fork, a first end of the third biasing member being axially fixed with respect to the shift rod, the third biasing member selectively causing translation of the first shift fork at at least one position of the shift drum.

In some embodiments, the first shift fork is disposed between the second end of the first biasing member and the second end of the third biasing member.

In some embodiments, the first biasing member is a first spring; the second biasing member is a second spring; the third biasing member is a third spring; and the first, second and third springs have equal stiffnesses.

In some embodiments, the transmission further includes a chain drive for selectively transferring reverse torque from the input shaft to the output shaft, the chain drive including a reverse input sprocket disposed on the input shaft; a reverse output sprocket disposed on the output shaft; and a chain disposed around the reverse input sprocket and the reverse output sprocket.

In some embodiments, at least a portion of the second groove and the third biasing member causing the first shift fork to selectively translate along the fork rod to control engagement of the first engagement dog with the reverse output sprocket at a third rotational position of the shift drum; and the transmission has a reverse shift position where: the shift drum is rotated to the third rotational position, the shift rod is translated to a third shift rod position along the rod axis by the driving member, the first engagement dog is engaged with the reverse output sprocket, the first engagement dog is disengaged from the first output gear, the second engagement dog is disengaged from the second output gear, and the transmission is transferring torque between the input shaft and the output shaft via the chain drive.

In some embodiments, the first output gear is a low output gear; the first input gear is a low input gear; the second output gear is a high output gear; the second input gear is a high input gear; the first ratio of the speed of rotation of the input shaft to the speed of rotation of the output shaft in the first shift position is a lowest ratio available in the transmission; and the second ratio of the speed of rotation of the input shaft to the speed of rotation of the output shaft in the second shift position is a highest ratio available in the transmission.

In some embodiments, the transmission further includes a terminal output gear connected to the output shaft for transferring torque of the output shaft to the at least one driving shaft for transferring motion to at least one ground engaging member.

In some embodiments, the transmission further includes a parking cog disposed on the output shaft for selectively preventing rotation of the output shaft; and wherein elements disposed on the output shaft are arranged sequentially as follows: the low output gear, the first engagement dog, the reverse output sprocket, the high output gear, the second engagement dog, and the parking cog.

In some embodiments, the first groove of the shift drum is circumferentially offset from the second and third grooves of the shift drum.

In some embodiments, the second groove includes a wider portion at the first rotational position, the wider portion being wider than at least one other portion of the second groove; the third groove includes a wider portion at the second rotational position, the wider portion being wider than at least one other portion of the third groove.

In some embodiments, when the first engagement dog and the first output gear are not rotationally aligned for engagement with each other, the wider portion of the second groove allows the first shift fork and the first engagement dog to remain in a disengaged position, the first biasing member being compressed against the first shift fork in order to bias the first engagement dog toward engagement with the first output gear; and when the first engagement dog and the first output gear are subsequently rotationally aligned for engagement with each other, the first biasing member pushes the first engagement dog via the first shift fork into engagement with the first output gear.

In some embodiments, the driving member is press-fit onto the shift rod.

In some embodiments, the first shift fork and the second shift fork are disposed on opposite sides of the driving member.

In some embodiments, the driving member includes: a first portion for connecting to the shift rod; a second portion for engagement of the support rod; and a member connected to and extending between the first portion and the second portion.

In some embodiments, the first portion defines an aperture through which the shift rod extends; and the second portion forms a fork which partially surrounds the support rod.

In some embodiments, the first portion includes a protrusion engaging with the first groove of the shift drum.

In some embodiments, the transmission further includes a transmission housing partially surrounding at least the shift rod; and wherein the first end of the second biasing member abuts the transmission housing.

In some embodiments, the input shaft rotates about an input axis; the output shaft rotates about an output axis; and the shift drum, the fork rod, the shift rod, and the support rod are disposed on a same side of a plane containing the input and output axes.

In some embodiments, a projection onto the plane of an axis defined by the fork rod is disposed between a projection of the rod axis onto the plane and a projection onto the plane of an axis defined by the support rod.

In some embodiments, a normal distance between the axis of the fork rod and the plane is less than a normal distance between the rod axis and the plane; and the normal distance between the axis of the fork rod and the plane is less than a normal distance between the axis of the support rod and the plane.

In some embodiments, the transmission further has a neutral shift position where: the shift drum is rotated to a neutral rotational position, the shift rod is translated to the second shift rod position along the rod axis by the driving member, the first engagement dog is disengaged from the first output gear, the second engagement dog is disengaged from the second output gear, and substantially no torque is transferred between the input shaft and the output shaft.

According to another aspect of the present technology, there is provided a vehicle including a motor; at least one ground engaging member; at least one driveshaft for driving the at least one ground engaging member; and a transmission according to any of the above embodiments, the input shaft being operatively connected to the motor and the output shaft being operatively connected to the at least one driveshaft.

In some embodiments, the at least one ground engaging member includes: at least one front ground engaging member, and at least one rear ground engaging member; and the at least one driveshaft includes: a front driveshaft driving the at least one front ground engaging member, and a rear driveshaft driving the at least one rear ground engaging member.

In some embodiments, the vehicle further includes a continuously variable transmission (CVT) operatively connected between the motor and the input shaft of the transmission assembly.

According to one aspect of the present technology, there is provided a transmission having a first shaft; a second shaft, one of the first shaft and the second shaft being adapted for operatively connecting to a motor, an other one of the first shaft and the second shaft being adapted for operatively connecting to at least one driveshaft; a shift drum for selectively controlling torque transfer between the first shaft and the second shaft, the shift drum being rotatable about a drum axis, the shift drum defining therein a first groove and a second groove; a shift rod extending parallel to the drum axis, the shift rod being translatable along a rod axis parallel to the drum axis; a driving member fixedly connected to the shift rod, the driving member engaging the first groove of the shift drum, at least a portion of the first groove causing the driving member and the shift rod to translate along the rod axis upon rotation of the shift drum; a first gear and a second gear disposed on the first shaft; a third gear disposed on the second shaft, the third gear operatively engaging the first gear; a fourth gear disposed on the second shaft, the fourth gear operatively engaging the second gear; an engagement dog disposed on the second shaft, the engagement dog being rotationally fixed and axially translatable with respect to the second shaft, the engagement dog selectively engaging the third gear to cause rotation of the second shaft by the third gear, the engagement dog selectively engaging the fourth gear to cause rotation of the second shaft by the fourth gear; a first biasing member disposed around the shift rod, the first biasing member having a first end and a second end, the first end of the first biasing member being axially fixed with respect to the shift rod; a second biasing member disposed around the shift rod, the second biasing member having a first end and a second end, the first end of the second biasing member being axially fixed with respect to the shift rod; a fork rod disposed parallel to the shift rod; a shift fork slidably connected to the fork rod and slidably connected to the shift rod, the shift fork being disposed between the third gear and the fourth gear, the shift fork being disposed between the second end of the first biasing member and the second end of the second biasing member, the shift fork engaging the second groove of the shift drum, at least a portion of the second groove and the first biasing member causing the shift fork to selectively translate along the fork rod in a first direction to control engagement of the engagement dog with the third gear at a first rotational position of the shift drum, at least another portion of the second groove and the second biasing member causing the shift fork to selectively translate along the fork rod in a second direction to control engagement of the engagement dog with the fourth gear at a second rotational position of the shift drum, the second direction being opposite the first direction; and the transmission having: a first shift position where: the shift drum is rotated to the first rotational position, the shift rod is translated in the first direction to a first shift rod position along the rod axis by the driving member, the engagement dog is engaged with the third gear, the engagement dog is disengaged from the fourth gear, and the transmission is transferring torque between the first shaft and the second shaft via the first gear and the third gear, and a second shift position where: the shift drum is rotated to the second rotational position, the shift rod is translated in the second direction to a second shift rod position along the rod axis by the driving member, the engagement dog is engaged with the fourth gear, the engagement dog is disengaged from the third gear, and the transmission is transferring torque between the first shaft and the second shaft via the second gear and the fourth gear.

In some embodiments, the first shaft is an input shaft adapted for operatively connecting to the motor; the second shaft is an output shaft adapted for operatively connecting to the at least one driveshaft; the first gear is a first input gear; the second gear is a second input gear; the third gear is a first output gear; and the fourth gear is a second output gear.

In some embodiments, a support rod is disposed parallel to the shift rod and the fork rod, the driving member slidably engages the support rod.

In some embodiments, the first biasing member is a first spring; the second biasing member is a second spring; and the first and second springs have equal stiffnesses.

In some embodiments, the second shift position is a reverse shift position; the second input gear is a reverse input sprocket; and the second output gear is a reverse output sprocket. The transmission also has a chain disposed around the reverse input sprocket and the reverse output sprocket. The reverse input sprocket, the reverse output sprocket and the chain together define a chain drive for selectively transferring reverse torque from the input shaft to the output shaft.

In some embodiments, the engagement dog is a first engagement dog; the shift fork is a first shift fork; and the shift drum further defines therein a third groove. The transmission also has: a third input gear disposed on the input shaft; a third output gear disposed on the output shaft, the third output gear operatively engaging the third input gear; a second engagement dog disposed on the output shaft, the second engagement dog being rotationally fixed and axially translatable with respect to the output shaft, the second engagement dog selectively engaging the third output gear to cause rotation of the output shaft by the third output gear; a third biasing member disposed around the shift rod, the third biasing member having a first end and a second end; and a second shift fork slidably connected to the fork rod and slidably connected to the shift rod, the second shift fork engaging the third groove of the shift drum, at least a portion of the third groove and the third biasing member causing the second shift fork to selectively translate along the fork rod to control engagement of the second engagement dog with the third output gear at a third rotational position of the shift drum. The transmission has a third shift position where: the shift drum is rotated to the third rotational position, the shift rod is translated to a third shift rod position along the rod axis by the driving member, the second engagement dog is engaged with the third output gear, the first engagement dog is disengaged from the first and second output gears, the transmission is transferring torque between the input shaft and the output shaft via the third input gear and the third output gear. In the first and reverse shift positions the second engagement dog is disengaged from the third output gear; the first shift position is arranged and structured to produce a first ratio of the speed of rotation of the output shaft to the speed of rotation of the input shaft; and the third shift position is arranged and structured to produce a second ratio of the speed of rotation of the output shaft to the speed of rotation of the input shaft.

In some embodiments, the first output gear is a low output gear; the first input gear is a low input gear; the third output gear is a high output gear; the third input gear is a high input gear; the first ratio of the speed of rotation of the output shaft to the speed of rotation of the input shaft in the first shift position is a lowest ratio available in the transmission; and the second ratio of the speed of rotation of the output shaft to the speed of rotation of the input shaft in the third shift position is a highest ratio available in the transmission.

In some embodiments, a parking cog is disposed on the output shaft for selectively preventing rotation of the output shaft. Elements disposed on the output shaft are arranged sequentially as follows: the low output gear, the first engagement dog, the reverse output sprocket, the high output gear, the second engagement dog, and the parking cog.

In some embodiments, the second groove includes wider portions at the first and second rotational positions, the wider portions being wider than at least one other portion of the second groove.

In some embodiments, when the shift drum is rotated to the first rotational position: when the engagement dog and the first output gear are not rotationally aligned for engagement with each other, one of the wider portions of the second groove allows the shift fork and the engagement dog to remain in a disengaged position, the first biasing member being compressed against the shift fork in order to bias the engagement dog toward engagement with the first output gear; and when the engagement dog and the first output gear are subsequently rotationally aligned for engagement with each other, the first biasing member pushes the engagement dog via the shift fork into engagement with the first output gear. When the shift drum is rotated to the second rotational position: when the engagement dog and the second output gear are not rotationally aligned for engagement with each other, another one of the wider portions of the second groove allows the shift fork and the engagement dog to remain in a disengaged position, the second biasing member being compressed against the shift fork in order to bias the engagement dog toward engagement with the second output gear; and when the engagement dog and the second output gear are subsequently rotationally aligned for engagement with each other, the second biasing member pushes the engagement dog via the shift fork into engagement with the second output gear.

In some embodiments, the first shift fork and the second shift fork are disposed on opposite sides of the driving member.

In some embodiments, the driving member includes: a first portion for connecting to the shift rod; a second portion for engagement of the support rod; and a member connected to and extending between the first portion and the second portion.

In some embodiments, the first portion defines an aperture through which the shift rod extends; and the second portion forms a fork which partially surrounds the support rod.

In some embodiments, the first portion includes a protrusion engaging with the first groove of the shift drum.

In some embodiments, a transmission housing partially surrounds at least the shift rod. The first end of the third biasing member abuts the transmission housing.

In some embodiments, the transmission also has a neutral shift position where: the shift drum is rotated to a neutral rotational position, the shift rod is translated to a third shift rod position along the rod axis by the driving member, the third shift rod position being between the first shift rod position and the second shift rod position, the engagement dog is disengaged from the first output gear, the engagement dog is disengaged from the second output gear, and substantially no torque is transferred between the input shaft and the output shaft.

According to another aspect of the present technology, there is provided a vehicle including a motor; at least one ground engaging member; at least one driveshaft for driving the at least one ground engaging member; and a transmission according to any of the above embodiments, the input shaft being operatively connected to the motor and the output shaft being operatively connected to the at least one driveshaft.

In some embodiments, a continuously variable transmission (CVT) is operatively connected between the motor and the input shaft of the transmission assembly.

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures are not necessarily drawn to scale.

DETAILED DESCRIPTION

The present technology is described with reference to its use in an off-road side-by-side vehicle (SSV). It is contemplated that the present technology could be implemented in different vehicles, including but not limited to all-terrain vehicles (ATVs), automobiles, other off-road vehicles, snowmobiles, and karts.

Figure 1:
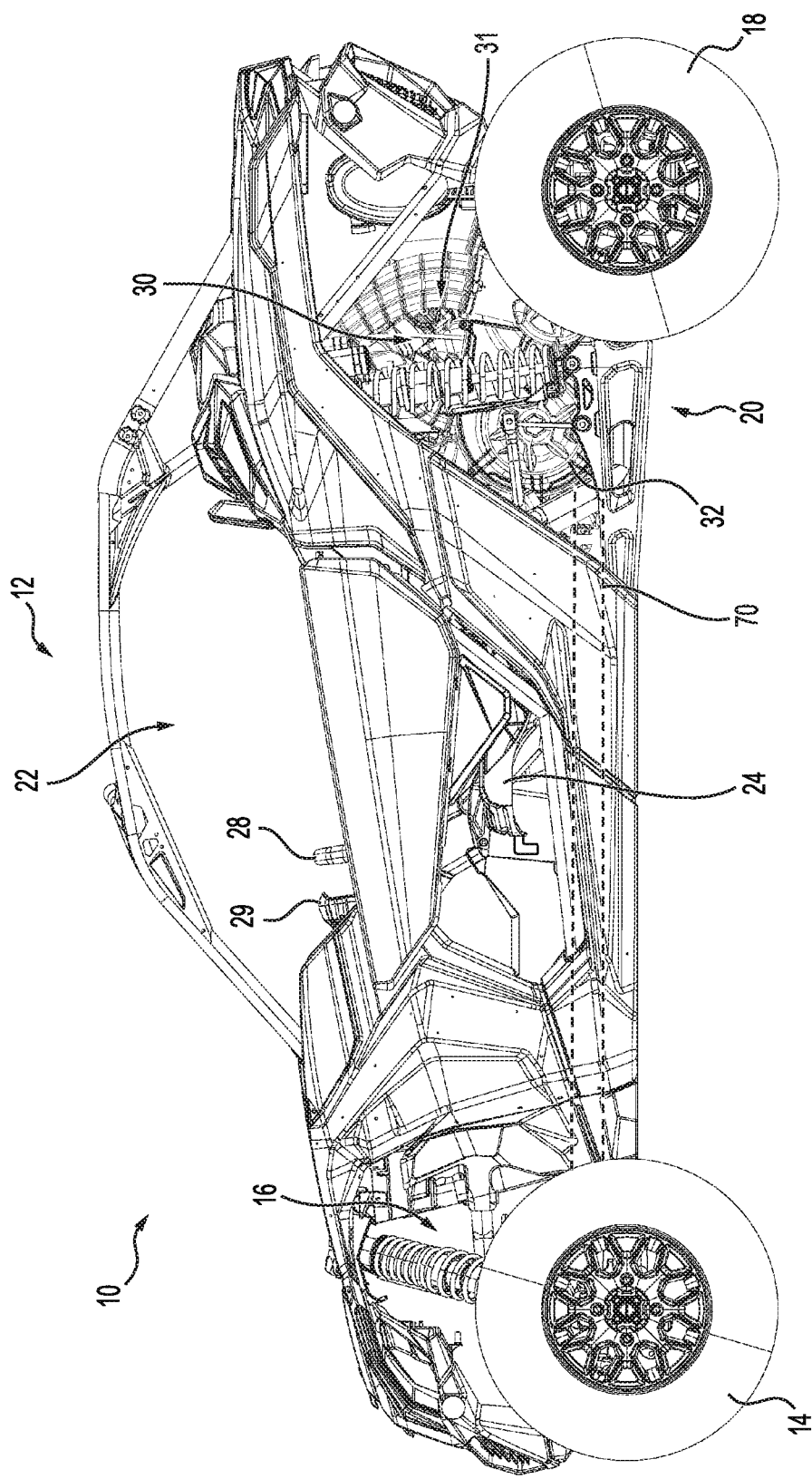
FIG. 1 is a left side elevation view of a vehicle.

The general features of a side-by-side vehicle (SSV) 10 will be described with respect to FIG. 1 as one non-limiting application of the present technology.

The vehicle 10 has a frame 12, two front wheels 14 connected to a front of the frame 12 by front suspension assemblies 16 and two rear wheels 18 connected to the frame 12 by rear suspension assemblies 20.

The frame 12 defines a central cockpit area 22 inside which are disposed a driver seat 24 and a passenger seat 26. A roll cage 106 defines a top side of the cockpit area 22. In the present embodiment, the driver seat 24 is disposed on the left side of the vehicle 10 and the passenger seat 26 is disposed on the right side of the vehicle 10. However, it is contemplated that the driver seat 24 could be disposed on the right side of the vehicle 10 and that the passenger seat 26 could be disposed on the left side of the vehicle 10.

A steering wheel 28 is disposed in front of the driver seat 24. The steering wheel 28 is used to turn the front wheels 14 to steer the vehicle 10. Various displays and gauges 29 are disposed above the steering wheel 28 to provide information to the driver regarding the operating conditions of the vehicle 10. Examples of displays and gauges 29 include, but are not limited to, a speedometer, a tachometer, a fuel gauge, a transmission position display, and an oil temperature gauge.

Figure 2:
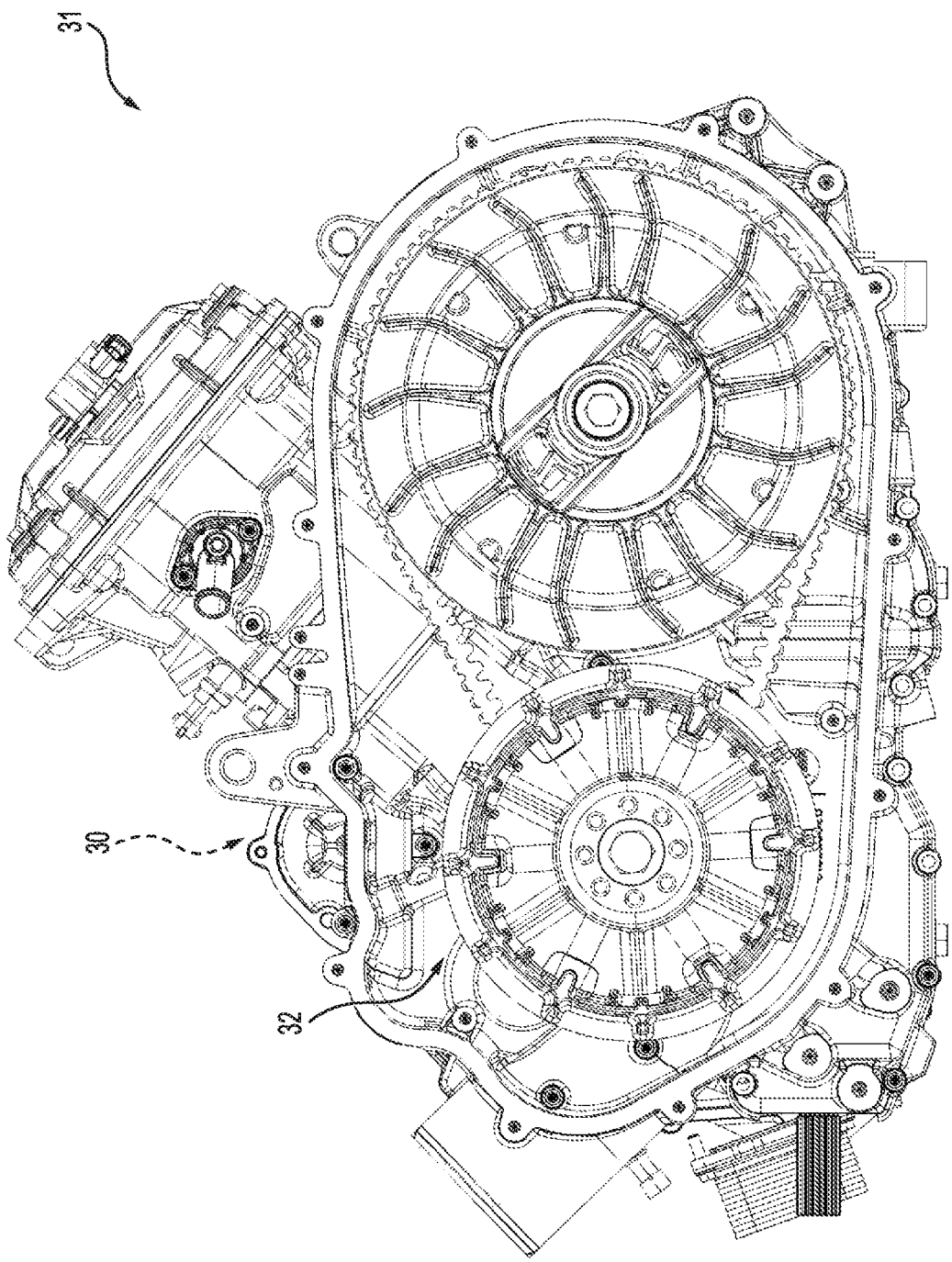
FIG. 2 is a left side elevation view of a motor assembly of the vehicle of FIG. 1, with a panel having been removed.
Figure 3:
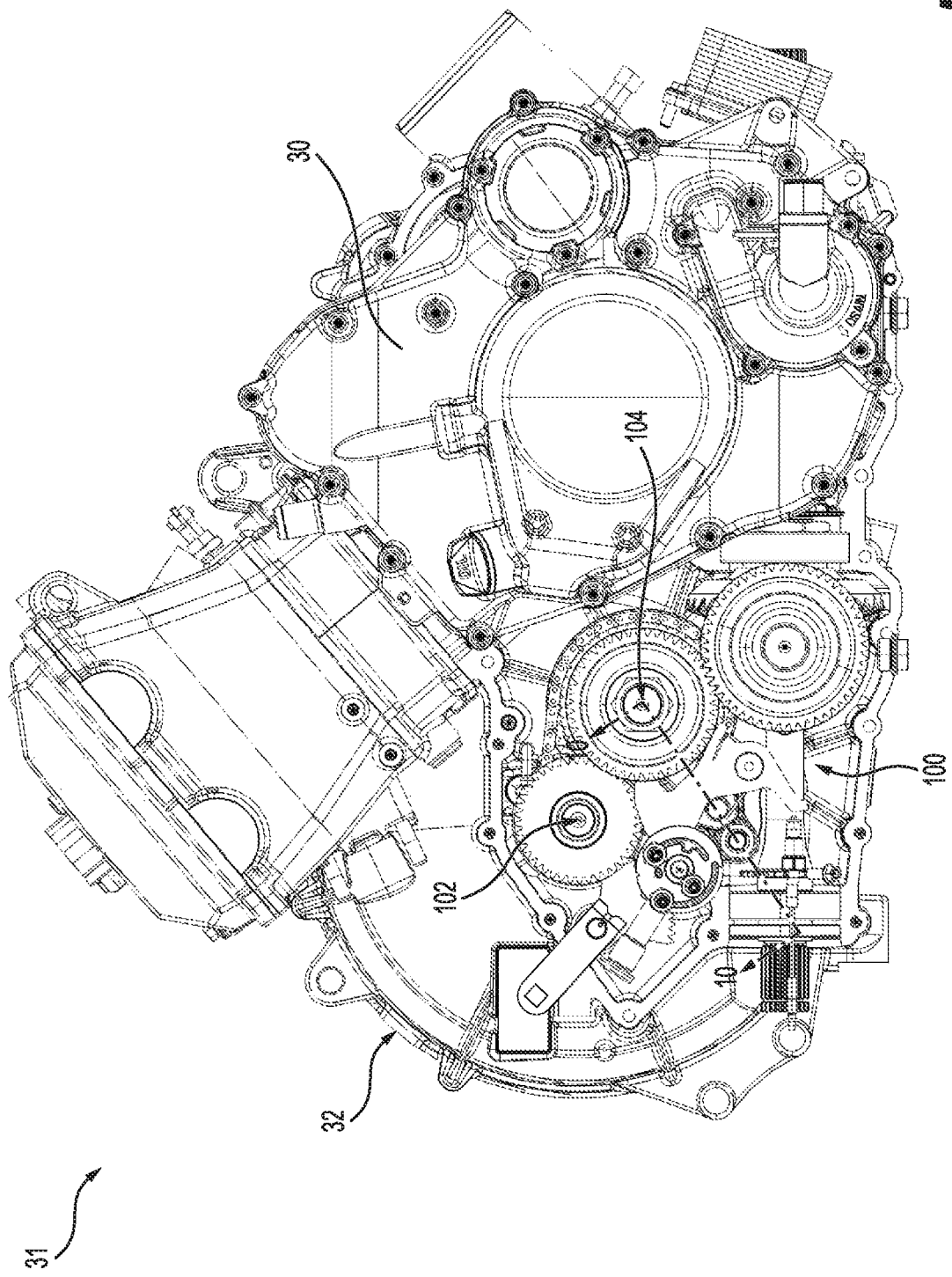
FIG. 3 is a right side elevation view of the motor assembly of FIG. 2, with an other panel having been removed.

With additional reference to FIGS. 2 and 3, the vehicle 10 further includes a motor assembly 31, which includes a motor 30, a continuously variable transmission (CVT) 32, and a transmission 100. The transmission 100 will be described in more detail below. The motor assembly 31 is connected to the frame 12 in a rear portion of the vehicle 10. In the present embodiment, the motor 30 is a single-cylinder, four-stroke internal combustion engine 30. It is contemplated that other types of internal combustion engines could be used, such as a V-twin or a two-stroke internal combustion engine for example. It is also contemplated that in some embodiments, the engine 30 could be replaced by another type of motor such as a diesel engine or an electric motor for example.

The engine 30 is connected to the CVT 32, which is disposed on a left side of the engine 30. The CVT 32 is operatively connected to driveshaft 70 (shown schematically in FIG. 1) via the transmission 100 to transmit torque from the engine 30. The driveshaft 70 includes a front driveshaft and a rear driveshaft (not separately illustrated), operatively connected to the front and rear wheels 14, 18 to propel the vehicle 10.

The transmission 100 is disposed behind the engine 30, to the right of a rear portion of the CVT 32. The transmission 100 controls the transfer of torque from the engine 30, via the CVT 32, to the driveshaft 70 through several different shift positions. According to the present technology, the transmission 100 can be selectively arranged to control the transfer of torque through a low gear shift position, a high gear shift position, and reverse gear shift position. The transmission 100 also includes a neutral shift position where no torque is transferred and a park shift position where no torque is transferred and motion of the driveshaft 70 is impeded.

The different components of the transmission 100 are illustrated in FIGS. 3 to 8, with the transmission 100 being illustrated in the neutral shift position. While the transmission 100 is disposed in a transmission housing 101, see FIG. 10 for example, the housing 101 has been removed in FIGS. 3 to 8 in order to better illustrate the components of the transmission 100 in some Figures. Operation of the transmission 100 will be described in more detail below.

The transmission 100 includes an input shaft 102 operatively connected to the engine 30 via the CVT 32 for receiving torque therefrom. The input shaft 102 extends generally laterally, rearward of the engine 30. The input shaft 102 rotates about an input axis 103, illustrated in FIGS. 7 and 8.

The transmission 100 includes an output shaft 104 operatively connected to the driveshaft 70 for transferring torque from the transmission 100 to the driveshaft 70 to drive the wheels 14, 18. Specifically, torque is transferred via a terminal output gear 138 disposed on the output shaft 104. The terminal output gear 138 is operatively connected to the driveshaft 70 and transfers torque from the output shaft 104 to the drive shaft 70. The output shaft 104 rotates about an output axis 105, arranged parallel to the input axis 103. Both rotation axes 103, 105 extend laterally in the vehicle 10, although this may not be the case in all embodiments of the vehicle 10.

The input and output shafts 102, 104 have gears thereon for operatively connecting the two shafts 102, 104 together. The input shaft 102 has thereon a plurality of gears for transferring torque to the output shaft 104, including a low input gear 122, a high input gear 124, and a reverse input sprocket 126. The elements 122, 124, 126 are rotationally fixed with respect to the input shaft 102, such that rotation of the input shaft 102 drives rotation of all of the elements 122, 124, 126 about the input axis 103.

Figure 4:
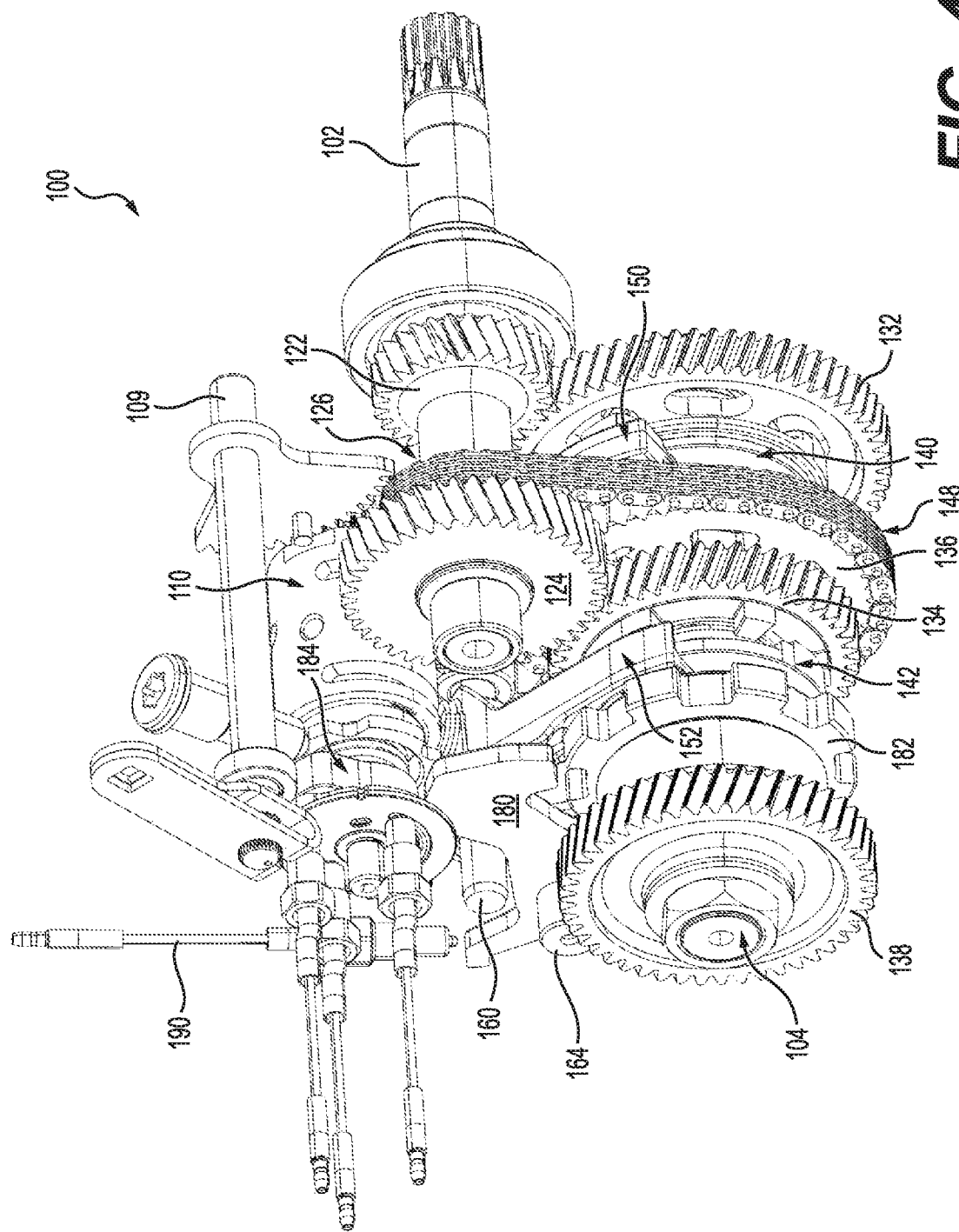
FIG. 4 is a top, front, right side perspective view of a transmission of the motor assembly of FIG. 2, with the transmission being in a neutral shift position.
Figure 5:
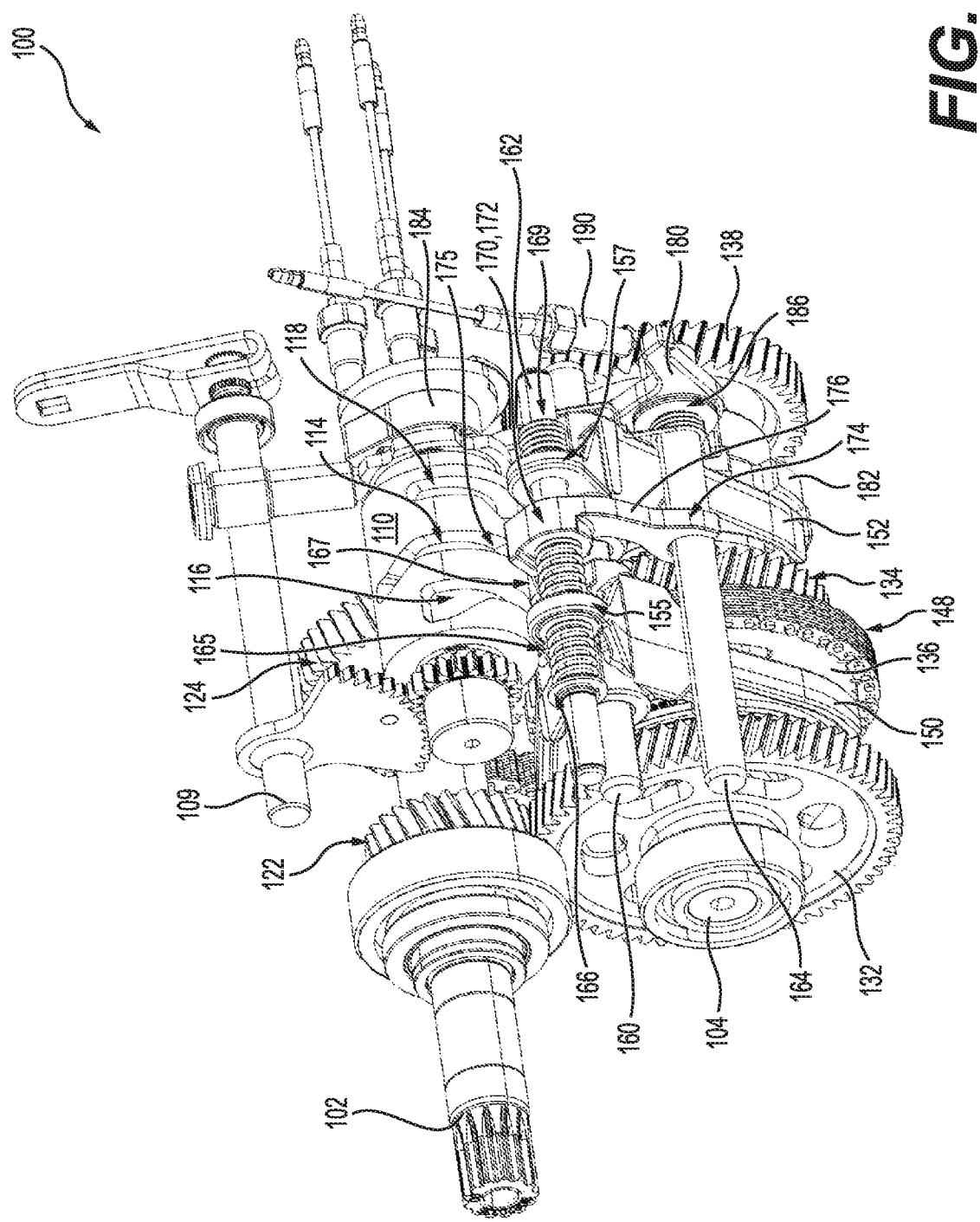
FIG. 5 is a bottom, rear, left side perspective view of the transmission of FIG. 4, with the transmission being in the neutral shift position.
Figure 6:
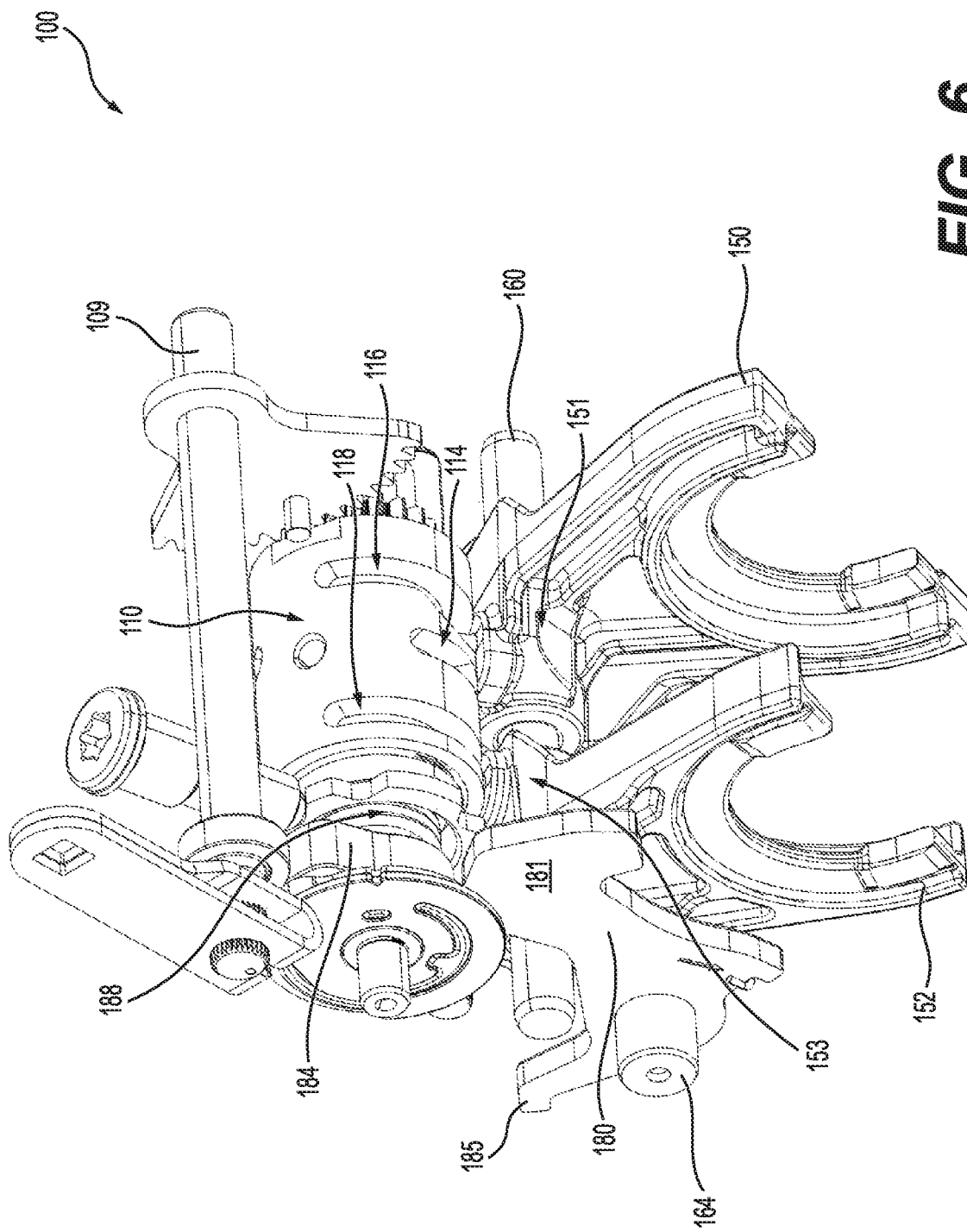
FIG. 6 is a top, front, right perspective view of portions of the transmission of FIG. 4.

The output shaft 104 has thereon a plurality of gears engaged with the input elements 122, 124, 126. In the present embodiment, the gears on the output shaft 104 include a low output gear 132, a high output gear 134, and a reverse output sprocket 136. As can be seen in FIG. 4, for example, the elements disposed on the output shaft 104 are arranged sequentially as follows: the low output gear 132, an engagement dog 140 (described below), the reverse output sprocket 136, the high output gear 134, an engagement dog 142, a parking cog 182, and a terminal output gear 138 (described further below).

The output elements 132, 134, 136 are free to rotate about the output shaft 104 and are not rotationally fixed to the output shaft 104. The low output gear 132 is engaged with the low input gear 122, such that rotation of the input shaft 102 causes rotation of the low output gear 132 via the low input gear 122. Similarly, the high output gear 134 is engaged with the high input gear 124, such that rotation of the input shaft 102 causes rotation of the high output gear 134 via the high input gear 124. In some embodiments, the transmission 100 could omit one of the high or low gear arrangements and may include simply a drive gear arrangement.

The reverse input sprocket 126 and the reverse output sprocket 136 are not directly engaged, but instead are connected by a toothed chain 146 disposed around the reverse input sprocket 126 and the reverse output sprocket 136 to form a chain drive 148. In some embodiments, the reverse input sprocket 126 and the reverse output sprocket 136 could be operatively connected by an idler gear in place of the toothed chain 146, depending on specifics of a given embodiment. It is also contemplated that a different type of chain could be used. It is also contemplated that the reverse gear arrangement could be omitted in some embodiments.

The output shaft 104 also includes two engagement dogs 140, 142 for coupling the output elements 132, 134, 136 to the output shaft 104 to selectively cause rotation of the output shaft 104. One engagement dog 140 is disposed laterally between the low output gear 132 and the reverse output sprocket 136. The other engagement dog 142 is disposed laterally between the high output gear 134 and the terminal output gear 138. The engagement dog 140 selectively engages with the low output gear 132 and the reverse output sprocket 136 (although only one at a time) and the engagement dog 142 selectively engages with the high output gear 134.

Each engagement dog 140, 142 is rotationally fixed with respect to the output shaft 104 via splines. As such, rotation of either engagement dog 140, 142, when engaged with a corresponding gear, causes rotation of the output shaft 104. Each engagement dog 140, 142 is also axially translatable with respect to the output shaft 104 and includes a plurality of axially extending projections (see for example FIG. 10) for inserting in a correspond set of openings in the sides of the output elements 132, 134, 136. By translating one of the engagement dogs 140, 142 into engagement with one of its corresponding output elements 132, 134, 136, the corresponding output element 132, 134, 136 is rotationally linked to the output shaft 104 such that rotation of the engaged output element 132, 134, 136 causes rotation of the output shaft 104.

While the engagement dogs 140, 142 are illustrated herein as being disposed on the output shaft 104, in some embodiments the engagement dogs 140, 142 could instead be disposed on the input shaft 102. In such a case, the input elements 122, 124, 126 would be rotationally independent of the input shaft 102 and the output elements 132, 134, 136 would be rotationally coupled with the output shaft 104. In some embodiments, it is also possible that one engagement dog could be used on each of the input and output shafts 102, 104.

The transmission 100 further includes two shift forks 150, 152 for controlling lateral displacement of the engagement dogs 140, 142. One shift fork 150 is disposed partially around the engagement dog 140. Specifically, the shift fork 150 has two curved prongs (see FIG. 6) received in a groove in the surface of the engagement dog 140 such that lateral movement of the shift fork 150 causes a corresponding lateral movement of the engagement dog 140 while rotational motion of the engagement dog 140 is not affected by the shift fork 150. Similarly, the shift fork 152 is disposed partially around the engagement dog 142 to control lateral movement of the engagement dog 142 while not impeding its rotational motion.

The two shift forks 150, 152 are supported by a fork rod 160. The shift forks 150, 152 are slidably connected to the fork rod 160, with the fork rod 160 extending through apertures in a wider portion 151, 153 of the shift forks 150, 152 (see for example FIG. 6). The fork rod 160 extends parallel to the input and output shaft axes 103, 105 and is disposed generally rearward and below the axes 103, 105.

To selectively control torque transfer from the input shaft 102 to the output shaft 104, the transmission 100 includes a shift drum 110. Specifically, the shift drum 110 selectively controls engagement and disengagement of the engagement dogs 140, 142 via control of lateral movement of the shift forks 150, 152 through rotation about a drum axis 112. The shift forks 150, 152 are operatively connected to the shift drum 110 via three grooves defined in the drum 110, as will be described in more detail below.

The shift forks 150, 152 are further slidably connected to a shift rod 162. Specifically, a smaller portion 155, 157 of each shift fork 150, 152, also referred to as followers 155, 157 are slidably disposed around the shift rod 162. The shift rod 162 extends parallel to the fork rod 160, the input and output shaft axes 103, 105, and the drum axis 112. The shift rod 162 is laterally translatable along a rod axis 163, also parallel to the input and output shaft axes 103, 105 and the drum axis 112. Operation of the shift rod 162 and the shift forks 150, 152 will be described in more detail below.

Lateral movement of the shift rod 162 is controlled by a driving member 170. The driving member 170 is fixedly connected to the shift rod 162, such that lateral movement of the driving member 170 causes lateral movement of the shift rod 162 along the axis 163. The shift forks 150, 152 are disposed on opposite sides of the driving member 170, although in some embodiments the arrangement could be modified. The driving member 170 is also slidably engaged with a support rod 164 disposed and extending parallel to the fork rod 160 and the shift rod 162. In some embodiments, the support rod 164 could be omitted.

Figure 10:
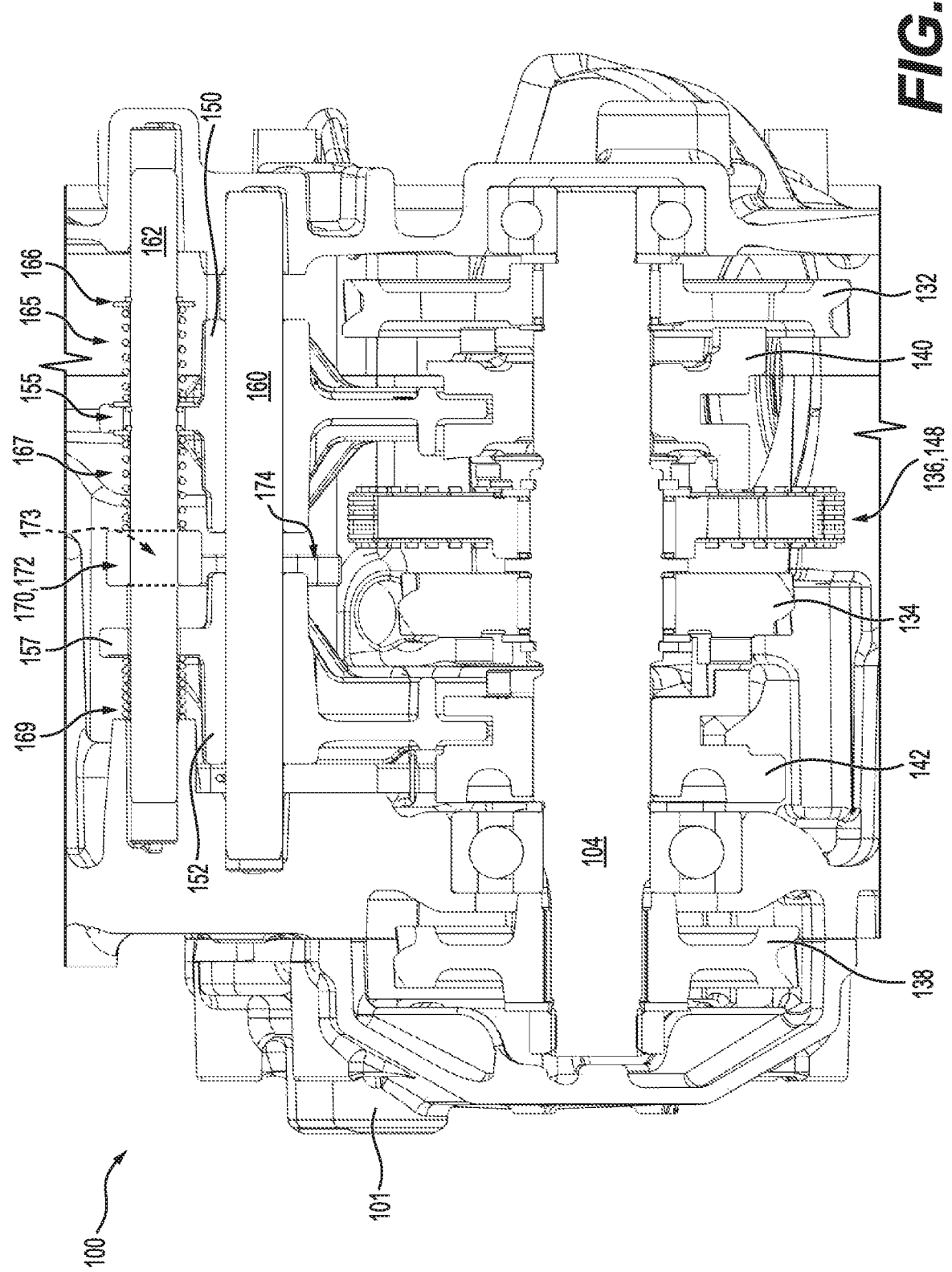
FIG. 10 is a cross-sectional view of the transmission of FIG. 4, taken along line 10-10 of FIG. 3, with the transmission being in the neutral shift position.
Figure 11:
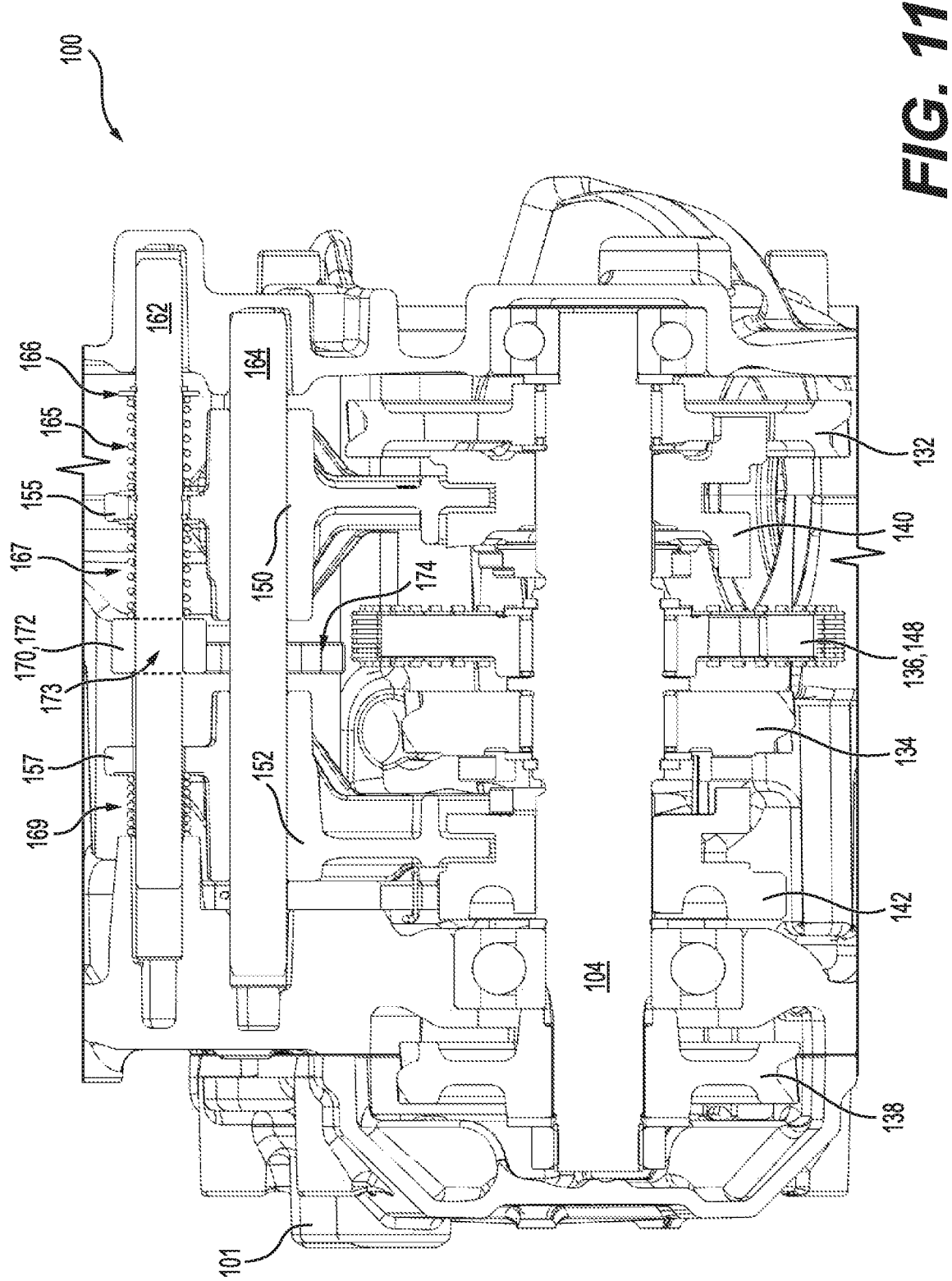
FIG. 11 is the cross-sectional view of FIG. 10, with the transmission in a low gear position.
Figure 12:
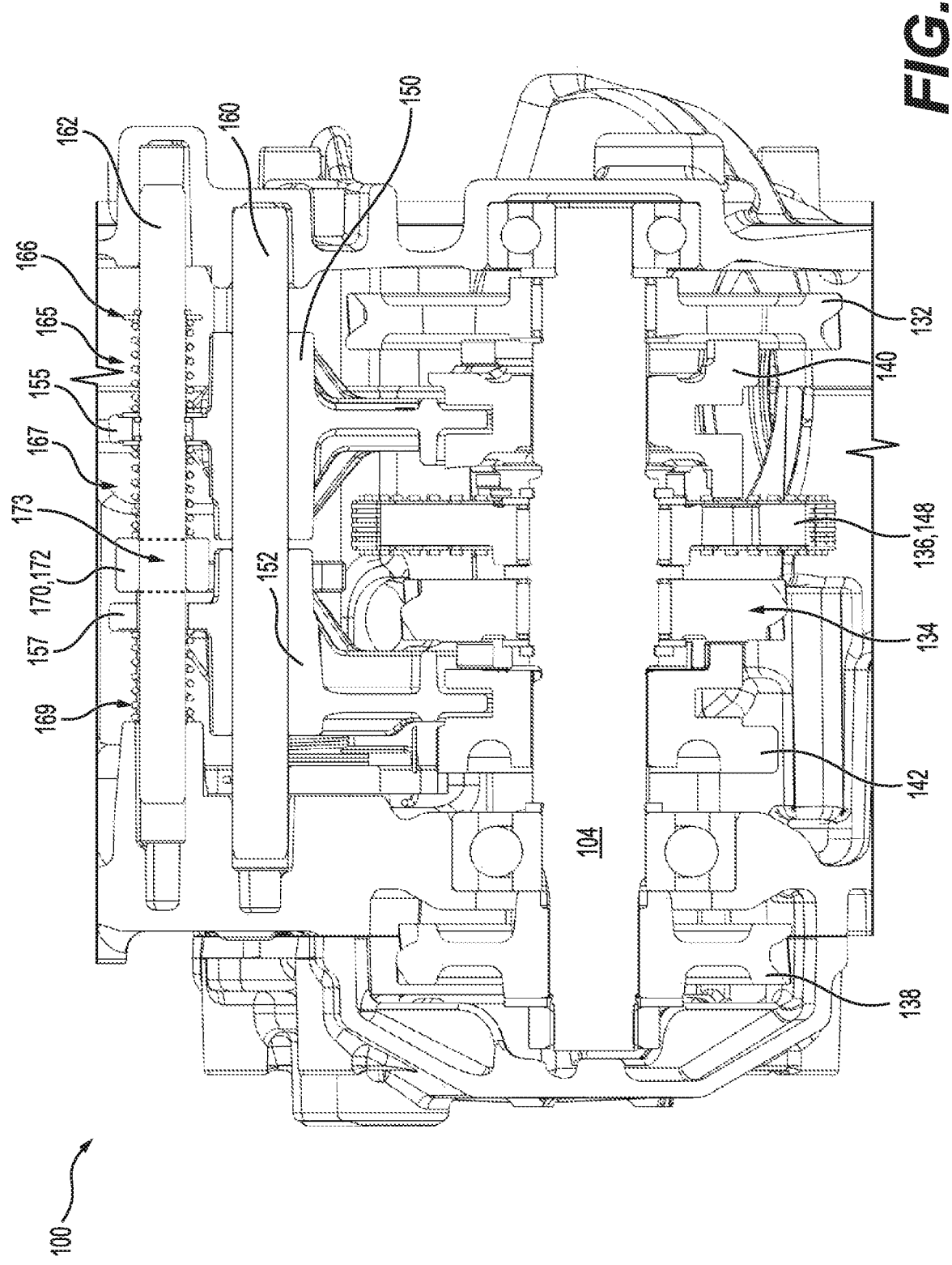
FIG. 12 is the cross-sectional view of FIG. 10, with the transmission in a high gear position.

The driving member 170 includes a first portion 172 which defines an aperture 173 (shown schematically in FIG. 10). The shift rod 162 extends through the aperture 173, where the driving member 170 is press-fit onto the shift rod 162. The portion 172 also includes a protrusion 175 which is received in a groove 114 defined in the shift drum 110 as will be described in more detail below.

Opposite the portion 172 disposed around the shift rod 162, the driving member 170 also includes a portion 174 which forms a fork 174 partially surrounding the support rod 164. The fork 174 is slidably connected to the support rod 162, which helps in preventing the driving member 170 and the shift rod 162 from rotating around the rod axis 163 during operation while allowing the driving member 170 to laterally translate with respect to the support rod 164. A member 176 is connected to and extends between the portions 172, 174.

The shift rod 162 has three biasing members 165, 167, 169 thereon. The biasing members are specifically springs 165, 167, 169 which work cooperatively with the shift drum 110 to selectively translate the shift forks 150, 152 (and their corresponding engagement dogs 140, 142). In the present embodiment, the three springs 165, 167, 169 have equal stiffnesses. It is contemplated that one or all three of the springs 165, 167, 169 could have different stiffnesses, depending on specific details of the particular embodiment.

One spring 165 has one end fixed relative to the shift rod 162. Specifically one end of the spring 165 abuts a washer 166 fixed around the shift rod 162. In some embodiments, one end of the spring 165 could be connected directly to the shift rod 162. The follower 155 of the shift fork 150 abuts the opposite end of the spring 165.

The spring 167 is disposed between the follower 155 of the shift fork 150 and the driving member 170. As such, the springs 165, 167 are disposed on opposite sides of the follower 155 of the shift fork 150. The shift fork 150 abuts one end of the spring 167 and the driving member 170 abuts the opposite end of the spring 167.

The spring 169 biases the shift fork 152, and the engagement dog 142, toward the high output gear 134. One end of the spring 169 abuts the transmission housing 101 (see FIG. 10). The opposite end of the spring 169 abuts the follower 157 of the shift fork 152. In contrast to the springs 165, 167, the spring 169 is generally compressed in all shift positions other than the high shift position.

The transmission 100 also includes components for a park shift position to prevent motion of the vehicle 10 as is noted above. The park shift position is specifically arranged to impede rotation of the output shaft 104. To hold the output shaft 104, the transmission 100 includes a parking lever 180 that selectively engages with a parking cog 182 on the output shaft 104 as can be seen in FIG. 8.

The parking lever 180 is rotatably connected to the support rod 164. In some embodiments, it is contemplated that the parking lever 180 could be connected to another one of the fork rod 160 and the shift rod 182. It is also contemplated that the parking lever 180 could be connected to a different components of the transmission 100. The parking cog 182 is disposed on the output shaft 104.

The parking cog 182 includes a plurality of teeth which define therebetween a plurality of notches 183. The notches 183 are sized and shaped to receive an end portion 181 of the parking lever 180. The parking cog 182 is rotationally fixed with respect to the output shaft 104, such that when the parking cog 182 is prevented from rotating, the output shaft 104 is also prevented from rotating. In the present embodiment, the parking cog 182 and the engagement dog 142 are integrally formed. It is contemplated that the parking cog 182 and the engagement dog 142 could be separate parts.

Figure 7:
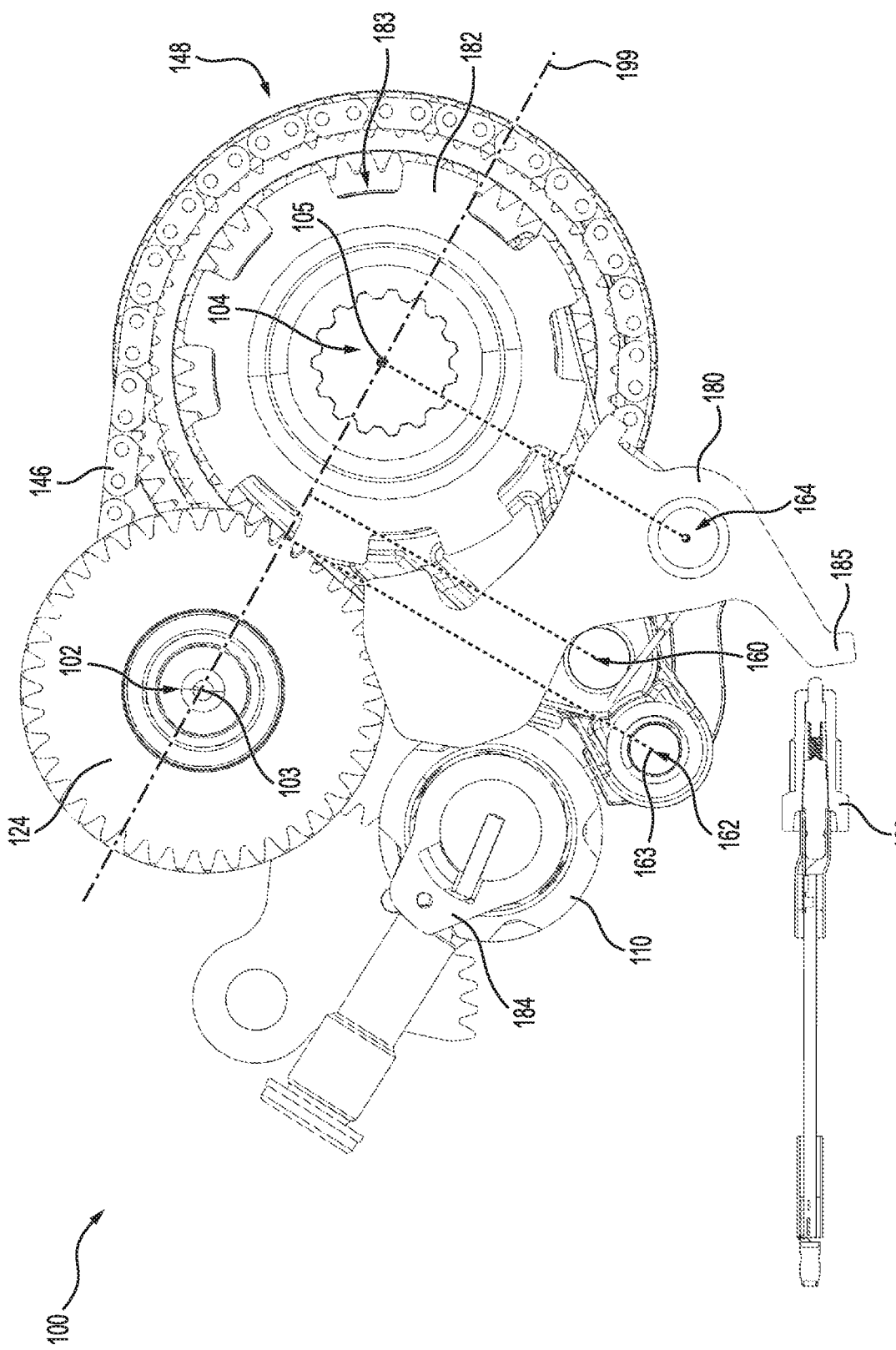
FIG. 7 is a right side elevation view of portions of the transmission of FIG. 4, with a parking assembly in a disengaged position.
Figure 8:
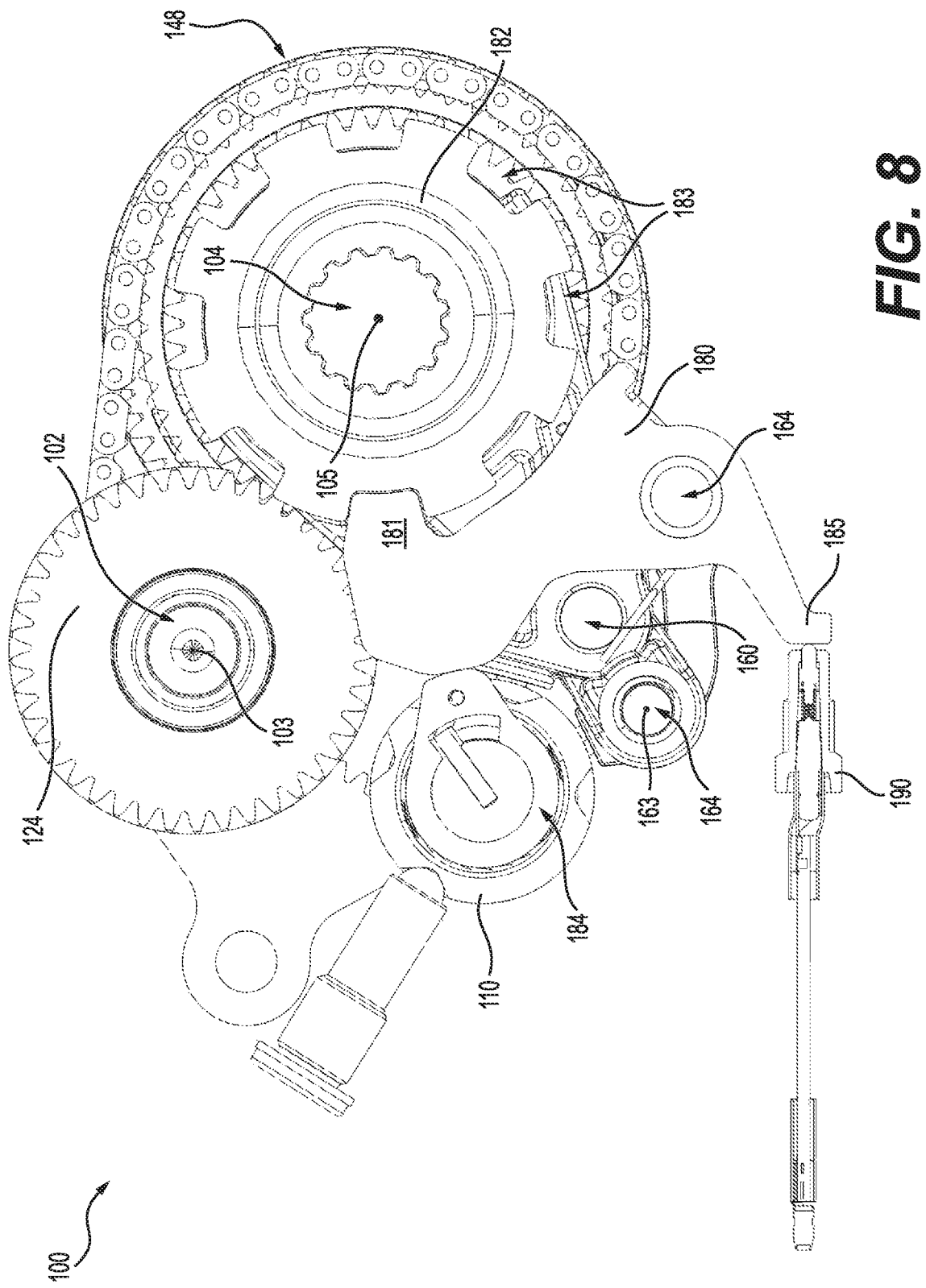
FIG. 8 is the right side elevation view of FIG. 7, with the parking assembly in an engaged position.

The parking lever 190 is pivotable between at least a disengaged position (FIG. 7) and an engaged position (FIG. 8). In the disengaged position, the parking lever 180 does not contact any components on the output shaft 104, including the parking cog 182, and the output shaft 104 can freely rotate according to the specific shift position of the transmission 100. In the engaged position, the parking lever 180 is rotated toward the parking cog 182, such that the end portion 181 is received in one of the notches 183. With the parking lever 180 inserted into one of the notches 183, the parking cog 182 is prevented from rotating, which in turn prevents the output shaft 104 from rotating.

In order to selectively rotate the parking lever 180 toward the parking cog 182, the transmission 100 also includes a parking cam 184 connected to the shift drum 110. As the shift drum 110 is selectively rotated to the park shift position of the shift drum 110, the parking cam 184 is rotated into pushing the parking lever 180 into engagement with the parking cog 182 to prevent rotation of the output shaft 104.

To prevent the parking lever 180 from engaging with the parking cog 182 when the transmission 100 is not in the park shift position, a parking spring 186 (FIG. 5) is included for biasing the parking lever 180 away from the parking cog 182. The spring 186 is disposed around the support rod 164 and is connected between the fork rod 160 and the parking lever 180.

Similarly, a parking spring 188 (FIG. 6) is included to prevent additional torquing in cases of misalignment and non-engagement between the parking cam 184 and the parking lever 180. The spring 188 is connected between the shift drum 110 and the parking cam 182. The parking cam 184 rotates with the shift drum 110 to push the parking lever 180 into engagement with the parking cog 182. When the parking lever 180 cannot engage with the parking cog 182 due a misalignment between the end portion 181 and the notches 183, the spring 188 allows the shift drum 110 to turn fully into the park shift position while biasing the parking lever 180, via the parking cam 184, toward engagement once the parking lever 180 and the parking cog 182 are subsequently aligned.

The transmission 100 also includes a parking lock sensor 190 for detecting when the transmission 100 is in the park shift position. The parking lock sensor 190 is selectively contacted by a protrusion 185 of the parking lever 180 (see FIG. 8) when the end portion 181 of the parking lever 180 is engaged with the parking cog 182. It is contemplated that the sensor 190 could be differently arranged with respect to the parking lever 180 and/or the cog 182.

The overall arrangement of the elements of the transmission 100 can be seen in at least FIG. 7, where a plane 199 containing the input and output axes 103, 105 is illustrated. The shift drum 110, the fork rod 160, the shift rod 162, and the support rod 164 are all disposed on a same side of the plane 199. The fork rod 160 is generally disposed between the shift rod 162 and the support rod 164, such that a projection of an axis of the fork rod 160 onto the plane 199 is disposed between a projection of the rod axis 163 onto the plane 199 and a projection of an axis defined by the support rod 164 onto the plane 199 (dotted lines extending between the axes and their projections).

As can also be seen in FIG. 7, the fork rod 160 is also disposed nearer to the plane 199 than the shift rod 162, such that a normal distance (also illustrated by the dotted lines) between the axis of the fork rod 160 and the plane 199 is less than a normal distance between the rod axis 163 and the plane 199. Similarly, the fork rod 160 is disposed nearer to the plane 199 than the support rod 164, such that the normal distance between the axis of the fork rod 160 and the plane 199 is less than a normal distance between the axis of the support rod 164 and the plane 199. It is contemplated that the arrangement of the rods 160, 162, 164 could vary, depending on the particular embodiment.

The shift drum 110 and operation of the transmission 100 will now be described in more detail with reference to FIGS. 9 to 15.

Figure 9:
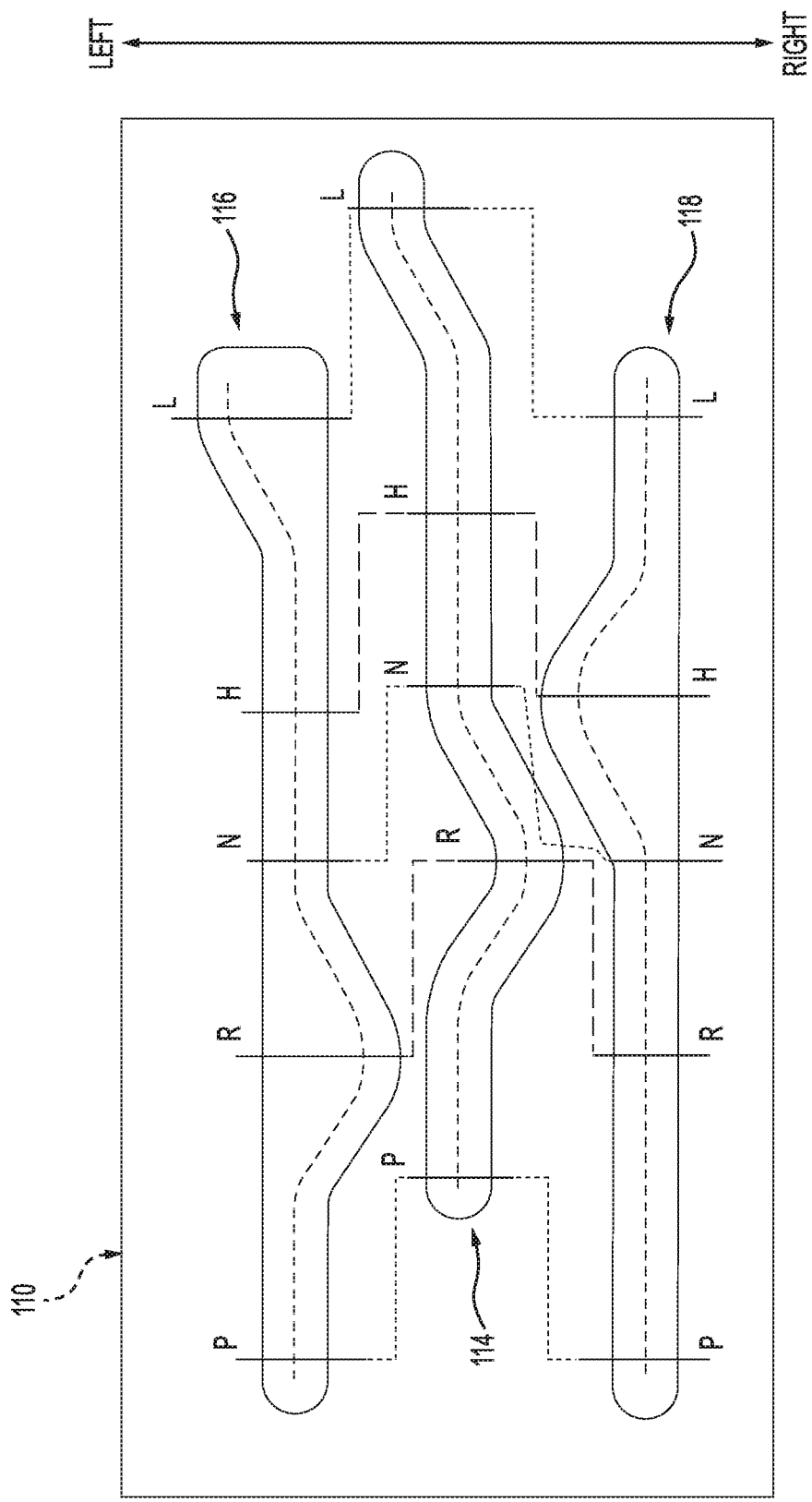
FIG. 9 is an illustration of grooves of a shift drum of the transmission of FIG. 4.

As is mentioned briefly above, the shift drum 110 defines three grooves in its surface: the center groove 114 and two shift fork grooves 116 and 118. The paths of the grooves 114, 116, 118 are illustrated in FIG. 9, with the surface of the shift drum 110 having been unwrapped onto a flat rectangle.

Each of the shift forks 150, 152 includes a protrusion (not shown) for engaging with the shift drum 110. The protrusion of the shift fork 150 is received in the groove 116 and the protrusion of the shift fork 152 is received in the groove 118. As is mentioned briefly above, the driving member 170 is also operatively connected to the shift drum 110, with the protrusion 175 of the driving member 170 being received in the groove 114.

The shift drum 110 selectively causes the transmission 100 to be arranged in one the following shift positions: the park shift position (identified as P in FIG. 9), the reverse shift position (R), a neutral shift position (N), a high gear shift position (H), and a low gear shift position (L). The identified positions in FIG. 9 correspond to the location of the protrusions of the shift forks 150, 152 in grooves 116, 118 and the protrusion 175 in the groove 114 at each of the different shift positions. The shift positions are illustrated in sequential rotational order on the shift drum 110, such that when shifting from park (P) to high gear shift position (H), for example, the shift drum 110 passes through the reverse and neutral gear shift positions.

At various positions, the grooves 116, 118 include wider portions (wider than at least one other portion of the groove 116, 118) which allow for some freedom of movement of the shift forks 150, 152, as will be described in more detail below. As the protrusion 175 of the driving member 170 is offset from the protrusions of the shift forks 150, 152, the center groove 114 is circumferentially offset from the grooves 116, 118.

In order to move the shift forks 150, 152 and the driving member 170 along the grooves 114, 116, 118 to change shift position of the transmission 100, the shift drum 110 rotates about the drum axis 112. Rotation of the shift drum 110 is controlled by a shift assembly 109 operatively connected to a gear selector (not shown) in the vehicle 10. The shift assembly 109 pivots to selectively rotate the shift drum 110 according to the position to which the gear selector is moved by an operator of the vehicle 10.

The transmission 100 includes the neutral shift position where the shift drum 110 is rotated to a neutral rotational position (N), the transmission 100 being arranged in the neutral shift position in FIG. 10. The shift rod 162 is translated to a central shift rod position along the rod axis 163 by the driving member 170, where the shift rod 162 is disposed midway between its more leftward and rightward positions. In the neutral shift position, the engagement dog 140 is disengaged from the low output gear 132 and the reverse output sprocket 136 and the engagement dog 152 is disengaged from the high output gear 134. As such, substantially no torque is transferred between the input shaft 102 and the output shaft 104.

The transmission also includes the park shift position (P), described above, where the output shaft 104 is impeded from rotating, which in turn impedes the driveshaft 70 from turning. In the park shift position, the shift drum 110 is rotated to a park rotational position (P) and the shift rod 162 is translated to the central shift rod position along the rod axis 163 by the driving member 170, the same position as the neutral shift position. As such, the engagement dog 140 is disengaged from the low output gear 132 and the reverse output sprocket 136 and the engagement dog 152 is disengaged from the high output gear 134. Additionally, the parking cam 184 is rotated by the shift drum 110 when rotating into the park rotation position, such that the parking cam 184 pushes the parking lever 180 into engagement with the parking cog 182. Thus substantially no torque is transferred between the input shaft 102 and the output shaft 104 and the output shaft 104 is impeded from rotating.

Figure 14:
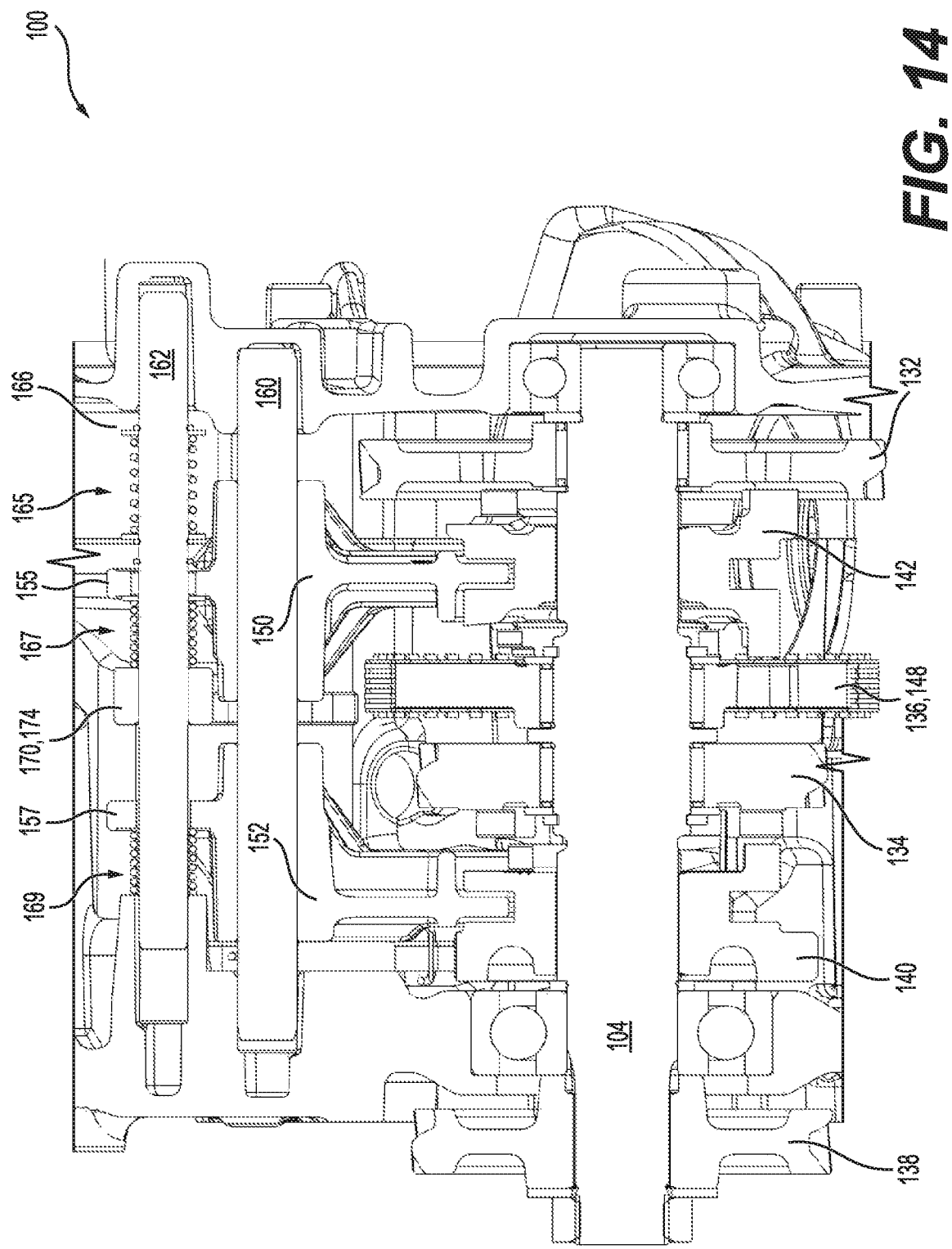
FIG. 14 is the cross-sectional view of FIG. 10, with the transmission biased toward the low gear position, but not being in the low gear position.

When the operator chooses the low gear shift position with the gear selector, the shift drum 110 is rotated to a low gear rotational position (L). The transmission 100 is arranged in the low gear shift position in FIG. 11. The shift rod 162 is translated to a left shift rod position along the rod axis 163 by the driving member 170 (as moved by the groove 114). In the left rod shift position, the shift rod 162 is translated to a left-most position. The groove 116 has a wider portion at the low gear rotational position, such that the shift fork 150 can move leftward while not being forced leftward. As is illustrated in FIG. 14, if the shift fork 150 cannot move due to misalignment of the engagement dog 140 and the low output gear 132, the spring 167 will instead be compressed by the leftward movement of the shift rod 162, and the spring 165 moves away from the follower 155 of the shift fork 150.

Simultaneously, the wider portion of the groove 116 allows the shift fork 150 and the engagement dog 140 to remain in a more centered and disengaged position. The compressed spring 167 biases the shift fork 150 and the engagement dog 140 toward engagement with the low output gear 132. When the engagement dog 150 and the low output gear 132 are subsequently rotationally aligned for engagement with each other, the spring 167 pushes the engagement dog 140 via the shift fork 150 into engagement with the low output gear 132.

In the low gear shift position, the engagement dog 152 is disengaged from the high output gear 134 and the engagement dog 140 is engaged with the low output gear 132. Thus, the transmission 100 transfers torque between the input shaft 102 and the output shaft 104 via the low input gear 122 and the low output gear 132. As suggested by the name, the low gear shift position is arranged and structured to produce a ratio of a speed of rotation of the output shaft 104 to a speed of rotation of the input shaft 102 that is a lowest ratio available in the transmission 100.

When the operator chooses the high gear shift position with the gear selector, the shift drum 110 is rotated to a high gear rotational position (H) and the shift rod 162 is translated to the central shift rod position along the rod axis 163 by the driving member 170. The transmission 100 is shown arranged in the high gear shift position in FIG. 12. The groove 118 includes a wider portion at the high gear rotational position to allow movement of the shift fork 152 leftward from the centered position. The spring 169, being compressed when the shift rod 162 is in the centered position, biases the shift fork 152 and the engagement dog 142 toward engagement with the high output gear 134. When the engagement dog 152 and the high output gear 134 are rotationally aligned for engagement with each other, the spring 169 pushes the engagement dog 142 via the shift fork 152 into engagement with the high output gear 134.

In the high gear shift position, the engagement dog 152 is engaged with the high output gear 134 and the engagement dog 150 is disengaged from the low output gear 132 and the reverse output sprocket 136. The transmission 100 thus transfers torque between the input shaft 102 and the output shaft 104 via the high input gear 124 and the high output gear 134. Similarly well-indicated by the name, the high gear shift position is arranged and structured to produce a ratio of the speed of rotation of the output shaft 104 to the speed of rotation of the input shaft 102 that is a highest ratio available in the transmission 100.

Figure 13:
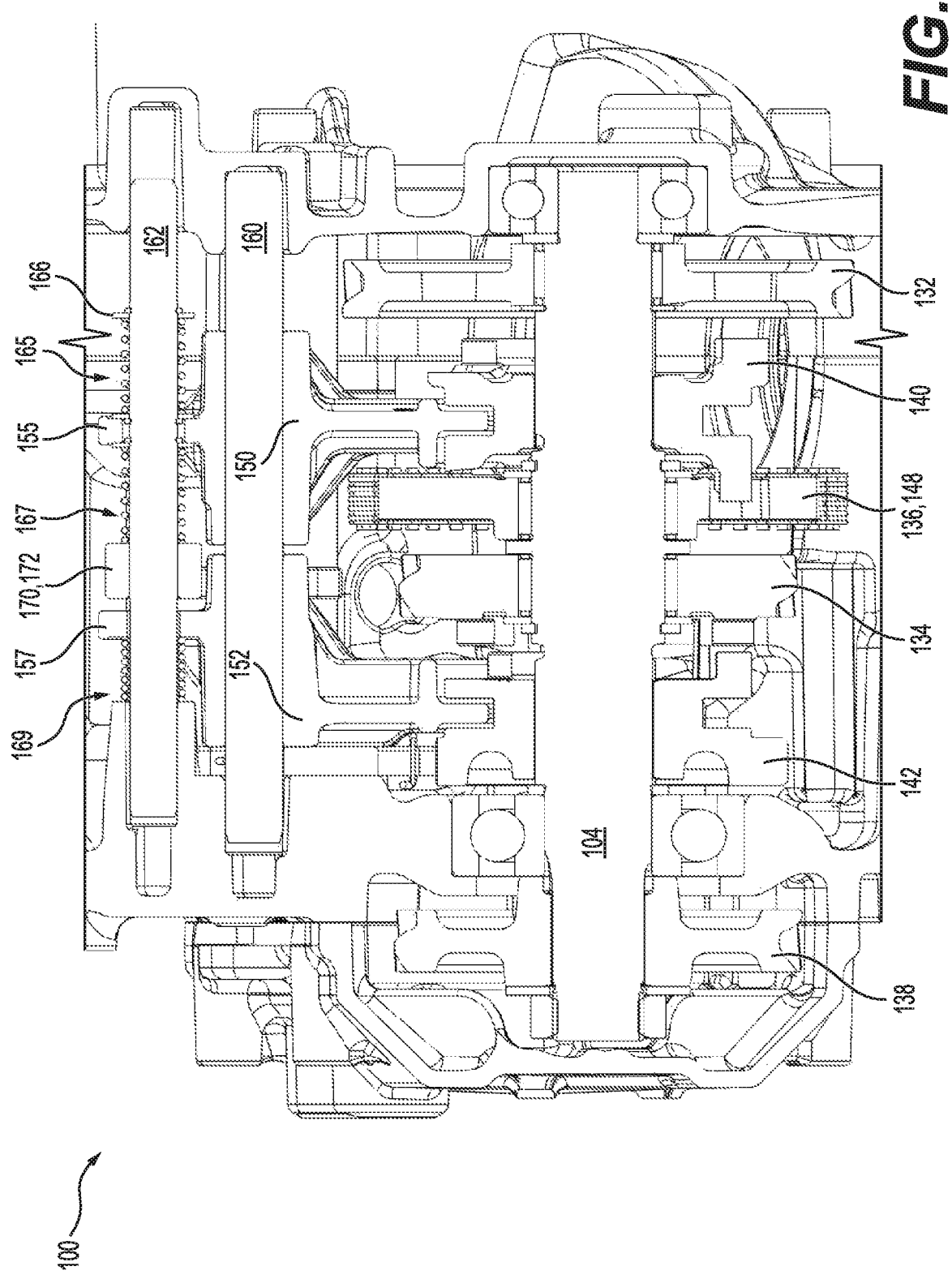
FIG. 13 is the cross-sectional view of FIG. 10, with the transmission in a reverse gear position.

The reverse gear shift position is illustrated in FIG. 13. When the operator chooses the reverse gear shift position with the gear selector, the shift drum 110 is rotated to a reverse gear rotational position (R) and the shift rod 162 is translated to a right shift rod position along the rod axis 163 by the driving member 170 (as moved by the groove 114). In the right rod position, the shift rod 162 is translated to a right-most position. The groove 116 has a wider portion at the reverse gear rotational position, such that the shift fork 150 can move rightward while not being forced rightward. Similarly to the low gear shift position, if the shift fork 150 cannot move due to misalignment of the engagement dog 140 and the reverse output sprocket 136, the spring 165 will instead be compressed by the rightward movement of the shift rod 162, and the spring 167 moves away from the follower 155 of the shift fork 150.

Simultaneously, the wider portion of the groove 116 allows the shift fork 150 and the engagement dog 140 to remain in a more centered and disengaged position. The spring 165 then biases the shift fork 150 and the engagement dog 140 rightward, toward engagement with the reverse output sprocket 136. When the engagement dog 150 and the reverse output sprocket 136 are subsequently rotationally aligned for engagement with each other, the spring 165 pushes the engagement dog 140 via the shift fork 150 into engagement with the reverse output sprocket 136.

In the reverse gear shift position, the engagement dog 152 is disengaged from the high output gear 134 and the engagement dog 140 is disengaged with the low output gear 132. Thus, the transmission 100 transfers torque between the input shaft 102 and the output shaft 104 via the chain drive 148. As suggested by the name, the reverse gear shift position is arranged and structured to cause the output shaft 104 to rotate in the opposite direction as when the transmission 100 is in the high or low gear shift positions.

Modifications and improvements to the above-described embodiments of the present technology may become apparent to those skilled in the art. The foregoing description is intended to be exemplary rather than limiting.

What is claimed is:

1. A transmission comprising:
   a first shaft;
   a second shaft,
   one of the first shaft and the second shaft being adapted for operatively connecting to a motor, an other one of the first shaft and the second shaft being adapted for operatively connecting to at least one driveshaft;
   a shift drum for selectively controlling torque transfer between the first shaft and the second shaft, the shift drum being rotatable about a drum axis, the shift drum defining therein a first groove, a second groove, and a third groove;
   a shift rod extending parallel to the drum axis, the shift rod being translatable along a rod axis parallel to the drum axis;
   a driving member fixedly connected to the shift rod, the driving member engaging the first groove of the shift drum, at least a portion of the first groove causing the driving member and the shift rod to translate along the rod axis upon rotation of the shift drum;
   a first gear and a second gear disposed on the first shaft;
   a third gear disposed on the second shaft, the third gear operatively engaging the first gear;
   a first engagement dog disposed on the second shaft, the first engagement dog being rotationally fixed and axially translatable with respect to the second shaft, the first engagement dog selectively engaging the third gear to cause rotation of the second shaft by the third gear;
   a fourth gear disposed on the second shaft, the fourth gear operatively engaging the second gear;
   a second engagement dog disposed on the second shaft, the second engagement dog being rotationally fixed and axially translatable with respect to the second shaft, the second engagement dog selectively engaging the fourth gear to cause rotation of the second shaft by the fourth gear;
   a first biasing member disposed around the shift rod, the first biasing member having a first end and a second end, the first end of the first biasing member being axially fixed with respect to the shift rod;
   a second biasing member disposed around the shift rod, the second biasing member having a first end and a second end;
   a fork rod disposed parallel to the shift rod;
   a first shift fork slidably connected to the fork rod and slidably connected to the shift rod,
   the first shift fork engaging the second groove of the shift drum, at least a portion of the second groove and the first biasing member causing the first shift fork to selectively translate along the fork rod to control engagement of the first engagement dog with the third gear at a first rotational position of the shift drum; and
   a second shift fork slidably connected to the fork rod and slidably connected to the shift rod,
   the second shift fork engaging the third groove of the shift drum, at least a portion of the third groove and the second biasing member causing the second shift fork to selectively translate along the fork rod to control engagement of the second engagement dog with the fourth gear at a second rotational position of the shift drum,
   the transmission having:
     a first shift position where:
       the shift drum is rotated to the first rotational position,
       the shift rod is translated to a first shift rod position along the rod axis by the driving member,
       the first engagement dog is engaged with the third gear,
       the second engagement dog is disengaged from the fourth gear,
       the transmission is transferring torque between the first shaft and the second shaft via the first gear and the third gear, and
       the first shift position being arranged and structured to produce a first ratio of a speed of rotation of the second shaft to a speed of rotation of the first shaft, and
     a second shift position where:
       the shift drum is rotated to the second rotational position,
       the shift rod is translated to a second shift rod position along the rod axis by the driving member,
       the second engagement dog is engaged with the fourth gear,
       the first engagement dog is disengaged from the third gear,
       the transmission is transferring torque between the first shaft and the second shaft via the second gear and the fourth gear, and
       the second shift position being arranged and structured to produce a second ratio of the speed of rotation of the second shaft to the speed of rotation of the first shaft.

2. The transmission of claim 1, wherein:
   the first shaft is an input shaft adapted for operatively connecting to the motor;
   the second shaft is an output shaft adapted for operatively connecting to the at least one driveshaft;
   the first gear is a first input gear;

the second gear is a second input gear;
the third gear is a first output gear; and
the fourth gear is a second output gear.

3. The transmission of claim 2, further comprising a support rod disposed parallel to the shift rod and the fork rod, the driving member slidably engaging the support rod.

4. The transmission of claim 2, further comprising a third biasing member disposed around the shift rod and biasing the first shift fork, a first end of the third biasing member being axially fixed with respect to the shift rod, the third biasing member selectively causing translation of the first shift fork at at least one position of the shift drum.

5. The transmission of claim 4, wherein the first shift fork is disposed between the second end of the first biasing member and the second end of the third biasing member.

6. The transmission of claim 4, wherein:
the first biasing member is a first spring;
the second biasing member is a second spring;
the third biasing member is a third spring; and
the first, second and third springs have equal stiffnesses.

7. The transmission of claim 4, further comprising a chain drive for selectively transferring reverse torque from the input shaft to the output shaft, the chain drive including:
a reverse input sprocket disposed on the input shaft;
a reverse output sprocket disposed on the output shaft; and
a chain disposed around the reverse input sprocket and the reverse output sprocket.

8. The transmission of claim 7, wherein:
at least a portion of the second groove and the third biasing member causing the first shift fork to selectively translate along the fork rod to control engagement of the first engagement dog with the reverse output sprocket at a third rotational position of the shift drum; and
the transmission has a reverse shift position where:
the shift drum is rotated to the third rotational position,
the shift rod is translated to a third shift rod position along the rod axis by the driving member, the first engagement dog is engaged with the reverse output sprocket,
the first engagement dog is disengaged from the first output gear,
the second engagement dog is disengaged from the second output gear, and
the transmission is transferring torque between the input shaft and the output shaft via the chain drive.

9. The transmission of claim 8, wherein:
the first output gear is a low output gear;
the first input gear is a low input gear;
the second output gear is a high output gear;
the second input gear is a high input gear;
the first ratio of the speed of rotation of the output shaft to the speed of rotation of the input shaft in the first shift position is a lowest ratio available in the transmission; and
the second ratio of the speed of rotation of the output shaft to the speed of rotation of the input shaft in the second shift position is a highest ratio available in the transmission.

10. The transmission of claim 9, further comprising:
a parking cog disposed on the output shaft for selectively preventing rotation of the output shaft; and
wherein elements disposed on the output shaft are arranged sequentially as follows: the low output gear, the first engagement dog, the reverse output sprocket, the high output gear, the second engagement dog, and the parking cog.

11. The transmission of claim 2, wherein:
the second groove includes a wider portion at the first rotational position, the wider portion being wider than at least one other portion of the second groove;
the third groove includes a wider portion at the second rotational position, the wider portion being wider than at least one other portion of the third groove.

12. The transmission of claim 11, wherein:
when the first engagement dog and the first output gear are not rotationally aligned for engagement with each other, the wider portion of the second groove allows the first shift fork and the first engagement dog to remain in a disengaged position, the first biasing member being compressed against the first shift fork in order to bias the first engagement dog toward engagement with the first output gear; and
when the first engagement dog and the first output gear are subsequently rotationally aligned for engagement with each other, the first biasing member pushes the first engagement dog via the first shift fork into engagement with the first output gear.

13. The transmission of claim 2, wherein the first shift fork and the second shift fork are disposed on opposite sides of the driving member.

14. The transmission of claim 3, wherein the driving member includes:
a first portion for connecting to the shift rod;
a second portion for engagement of the support rod; and
a member connected to and extending between the first portion and the second portion.

15. The transmission of claim 14, wherein:
the first portion defines an aperture through which the shift rod extends; and
the second portion forms a fork which partially surrounds the support rod.

16. The transmission of claim 14, wherein the first portion includes a protrusion engaging with the first groove of the shift drum.

17. The transmission of claim 2, further comprising a transmission housing partially surrounding at least the shift rod; and
wherein the first end of the second biasing member abuts the transmission housing.

18. The transmission of claim 2, wherein the transmission further has a neutral shift position where:
the shift drum is rotated to a neutral rotational position,
the shift rod is translated to the second shift rod position along the rod axis by the driving member,
the first engagement dog is disengaged from the first output gear,
the second engagement dog is disengaged from the second output gear, and
substantially no torque is transferred between the input shaft and the output shaft.

19. A vehicle comprising:
a motor;
at least one ground engaging member;
at least one driveshaft for driving the at least one ground engaging member; and
a transmission according to claim 2, the input shaft being operatively connected to the motor and the output shaft being operatively connected to the at least one driveshaft.

20. The vehicle of claim 19, further comprising a continuously variable transmission (CVT) operatively connected between the motor and the input shaft of the transmission assembly.

21. A transmission comprising:
a first shaft;
a second shaft,
one of the first shaft and the second shaft being adapted for operatively connecting to a motor, an other one of the first shaft and the second shaft being adapted for operatively connecting to at least one driveshaft;
a shift drum for selectively controlling torque transfer between the first shaft and the second shaft, the shift drum being rotatable about a drum axis, the shift drum defining therein a first groove and a second groove;
a shift rod extending parallel to the drum axis, the shift rod being translatable along a rod axis parallel to the drum axis;
a driving member fixedly connected to the shift rod, the driving member engaging the first groove of the shift drum, at least a portion of the first groove causing the driving member and the shift rod to translate along the rod axis upon rotation of the shift drum;
a first gear and a second gear disposed on the first shaft;
a third gear disposed on the second shaft, the third gear operatively engaging the first gear;
a fourth gear disposed on the second shaft, the fourth gear operatively engaging the second gear;
an engagement dog disposed on the second shaft, the engagement dog being rotationally fixed and axially translatable with respect to the second shaft, the engagement dog selectively engaging the third gear to cause rotation of the second shaft by the third gear, the engagement dog selectively engaging the fourth gear to cause rotation of the second shaft by the fourth gear;
a first biasing member disposed around the shift rod, the first biasing member having a first end and a second end, the first end of the first biasing member being axially fixed with respect to the shift rod;
a second biasing member disposed around the shift rod, the second biasing member having a first end and a second end, the first end of the second biasing member being axially fixed with respect to the shift rod;
a fork rod disposed parallel to the shift rod;
a shift fork slidably connected to the fork rod and slidably connected to the shift rod, the shift fork being disposed between the third gear and the fourth gear, the shift fork being disposed between the second end of the first biasing member and the second end of the second biasing member,
the shift fork engaging the second groove of the shift drum,
at least a portion of the second groove and the first biasing member causing the shift fork to selectively translate along the fork rod in a first direction to control engagement of the engagement dog with the third gear at a first rotational position of the shift drum,
at least another portion of the second groove and the second biasing member causing the shift fork to selectively translate along the fork rod in a second direction to control engagement of the engagement dog with the fourth gear at a second rotational position of the shift drum, the second direction being opposite the first direction; and
the transmission having:
a first shift position where:
the shift drum is rotated to the first rotational position,
the shift rod is translated in the first direction to a first shift rod position along the rod axis by the driving member,
the engagement dog is engaged with the third gear,
the engagement dog is disengaged from the fourth gear, and
the transmission is transferring torque between the first shaft and the second shaft via the first gear and the third gear, and
a second shift position where:
the shift drum is rotated to the second rotational position,
the shift rod is translated in the second direction to a second shift rod position along the rod axis by the driving member,
the engagement dog is engaged with the fourth gear,
the engagement dog is disengaged from the third gear, and
the transmission is transferring torque between the first shaft and the second shaft via the second gear and the fourth gear.

22. The transmission of claim 21, wherein:
the first shaft is an input shaft adapted for operatively connecting to the motor;
the second shaft is an output shaft adapted for operatively connecting to the at least one driveshaft;
the first gear is a first input gear;
the second gear is a second input gear;
the third gear is a first output gear; and
the fourth gear is a second output gear.

23. The transmission of claim 22, further comprising a support rod disposed parallel to the shift rod and the fork rod, the driving member slidably engaging the support rod.

24. The transmission of claim 21, wherein:
the first biasing member is a first spring;
the second biasing member is a second spring; and
the first and second springs have equal stiffnesses.

25. The transmission of claim 22, wherein:
the second shift position is a reverse shift position;
the second input gear is a reverse input sprocket; and
the second output gear is a reverse output sprocket; and
the transmission further comprises a chain disposed around the reverse input sprocket and the reverse output sprocket,
the reverse input sprocket, the reverse output sprocket and the chain together defining a chain drive for selectively transferring reverse torque from the input shaft to the output shaft.

26. The transmission of claim 25, wherein:
the engagement dog is a first engagement dog;
the shift fork is a first shift fork;
the shift drum further defines therein a third groove;
the transmission further comprises:
a third input gear disposed on the input shaft;
a third output gear disposed on the output shaft, the third output gear operatively engaging the third input gear;
a second engagement dog disposed on the output shaft, the second engagement dog being rotationally fixed and axially translatable with respect to the output shaft, the second engagement dog selectively engaging the third output gear to cause rotation of the output shaft by the third output gear;

a third biasing member disposed around the shift rod, the third biasing member having a first end and a second end; and a second shift fork slidably connected to the fork rod and slidably connected to the shift rod, the second shift fork engaging the third groove of the shift drum, at least a portion of the third groove and the third biasing member causing the second shift fork to selectively translate along the fork rod to control engagement of the second engagement dog with the third output gear at a third rotational position of the shift drum, the transmission having a third shift position where:
the shift drum is rotated to the third rotational position,
the shift rod is translated to a third shift rod position along the rod axis by the driving member,
the second engagement dog is engaged with the third output gear,
the first engagement dog is disengaged from the first and second output gears,
the transmission is transferring torque between the input shaft and the output shaft via the third input gear and the third output gear, and wherein:
in the first and reverse shift positions the second engagement dog is disengaged from the third output gear;
the first shift position is arranged and structured to produce a first ratio of the speed of rotation of the output shaft to the speed of rotation of the input shaft; and;
the third shift position is arranged and structured to produce a second ratio of the speed of rotation of the output shaft to the speed of rotation of the input shaft.

27. The transmission of claim 26, wherein:
the first output gear is a low output gear;
the first input gear is a low input gear;
the third output gear is a high output gear;
the third input gear is a high input gear;
the first ratio of the speed of rotation of the output shaft to the speed of rotation of the input shaft in the first shift position is a lowest ratio available in the transmission; and
the second ratio of the speed of rotation of the output shaft to the speed of rotation of the input shaft in the third shift position is a highest ratio available in the transmission.

28. The transmission of claim 27, further comprising:
a parking cog disposed on the output shaft for selectively preventing rotation of the output shaft; and
wherein elements disposed on the output shaft are arranged sequentially as follows: the low output gear, the first engagement dog, the reverse output sprocket, the high output gear, the second engagement dog, and the parking cog.

29. The transmission of claim 22, wherein:
the second groove includes wider portions at the first and second rotational positions, the wider portions being wider than at least one other portion of the second groove.

30. The transmission of claim 29, wherein, when the shift drum is rotated to the first rotational position:
when the engagement dog and the first output gear are not rotationally aligned for engagement with each other, one of the wider portions of the second groove allows the shift fork and the engagement dog to remain in a disengaged position, the first biasing member being compressed against the shift fork in order to bias the engagement dog toward engagement with the first output gear; and when the engagement dog and the first output gear are subsequently rotationally aligned for engagement with each other, the first biasing member pushes the engagement dog via the shift fork into engagement with the first output gear; and wherein, when the shift drum is rotated to the second rotational position:
when the engagement dog and the second output gear are not rotationally aligned for engagement with each other, another one of the wider portions of the second groove allows the shift fork and the engagement dog to remain in a disengaged position, the second biasing member being compressed against the shift fork in order to bias the engagement dog toward engagement with the second output gear; and when the engagement dog and the second output gear are subsequently rotationally aligned for engagement with each other, the second biasing member pushes the engagement dog via the shift fork into engagement with the second output gear.

31. The transmission of claim 26, wherein the first shift fork and the second shift fork are disposed on opposite sides of the driving member.

32. The transmission of claim 23, wherein the driving member includes:
a first portion for connecting to the shift rod;
a second portion for engagement of the support rod; and
a member connected to and extending between the first portion and the second portion.

33. The transmission of claim 32, wherein:
the first portion defines an aperture through which the shift rod extends; and
the second portion forms a fork which partially surrounds the support rod.

34. The transmission of claim 32, wherein the first portion includes a protrusion engaging with the first groove of the shift drum.

35. The transmission of claim 26, further comprising a transmission housing partially surrounding at least the shift rod; and
wherein the first end of the third biasing member abuts the transmission housing.

36. The transmission of claim 22, wherein the transmission further has a neutral shift position where:
the shift drum is rotated to a neutral rotational position,
the shift rod is translated to a third shift rod position along the rod axis by the driving member, the third shift rod position being between the first shift rod position and the second shift rod position,
the engagement dog is disengaged from the first output gear,
the engagement dog is disengaged from the second output gear, and
substantially no torque is transferred between the input shaft and the output shaft.

37. A vehicle comprising:
a motor;
at least one ground engaging member;
at least one driveshaft for driving the at least one ground engaging member; and a transmission according to claim 22, the input shaft being operatively connected to the motor and the output shaft being operatively connected to the at least one driveshaft.

38. The vehicle of claim 37, further comprising a continuously variable transmission (CVT) operatively connected between the motor and the input shaft of the transmission assembly.

\* \* \* \* \*